(12) United States Patent
Nishimura et al.

(10) Patent No.: US 11,852,260 B2
(45) Date of Patent: Dec. 26, 2023

(54) TIME DELAY VALVE AND FLOW RATE CONTROLLER

(71) Applicant: SMC CORPORATION, Chiyoda-ku (JP)

(72) Inventors: Akiho Nishimura, Tsukubamirai (JP); Akira Tadano, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 18/000,659

(22) PCT Filed: Sep. 30, 2020

(86) PCT No.: PCT/JP2020/037157
§ 371 (c)(1),
(2) Date: Dec. 2, 2022

(87) PCT Pub. No.: WO2021/245957
PCT Pub. Date: Dec. 9, 2021

(65) Prior Publication Data
US 2023/0213113 A1      Jul. 6, 2023

(30) Foreign Application Priority Data

Jun. 4, 2020  (JP) .................................. 2020-097348

(51) Int. Cl.
*F16K 31/36* (2006.01)
*G05D 7/01* (2006.01)
*F16K 31/363* (2006.01)

(52) U.S. Cl.
CPC ........... *F16K 31/363* (2013.01); *G05D 7/014* (2013.01)

(58) Field of Classification Search
CPC .............................. F16K 31/363; G05D 7/014
See application file for complete search history.

(56) References Cited

U.S. PATENT DOCUMENTS

2013/0081725 A1   4/2013   Arisato
2021/0404486 A1   12/2021  Takakuwa et al.

FOREIGN PATENT DOCUMENTS

CN     202707654 U    1/2013
JP     2001-50204 A    2/2001
(Continued)

OTHER PUBLICATIONS

International Search Report dated Nov. 24, 2020 in PCT/JP2020/037157 filed on Sep. 30, 2020 (citing references 18 & 21-22 therein, 2 pages).

(Continued)

*Primary Examiner* — Paul J Gray
(74) *Attorney, Agent, or Firm* — Oblon, McClelland, Maier & Neustadt, L.L.P.

(57) ABSTRACT

A time delay valve includes a switching valve that switches between a first position and a second position; an urging member that urges the switching valve toward the first position; a driving mechanism that urges the switching valve toward the second position located opposite the first position in the presence of the pressure of a pilot fluid being supplied; a pilot flow channel that introduces the pilot fluid to the driving mechanism; and a delaying mechanism that delays the switching timing of the switching valve. The delaying mechanism includes a first throttle valve provided on the pilot flow channel, a compensation mechanism that urges the switching valve toward the first position in the presence of the pressure of the pilot fluid being supplied, and a compensation flow channel that is branched from the pilot flow channel to introduce a portion of the pilot fluid to the compensation mechanism.

11 Claims, 21 Drawing Sheets

(56) References Cited

FOREIGN PATENT DOCUMENTS

| | | |
|---|---|---|
| JP | 3161965 B2 | 4/2001 |
| JP | 4595411 B2 | 12/2010 |
| JP | 5578502 B2 | 8/2014 |
| JP | 5632914 B2 | 11/2014 |
| JP | 2015-90156 A | 5/2015 |
| JP | 5756984 B1 | 7/2015 |
| WO | WO 2020/095775 A1 | 5/2020 |

OTHER PUBLICATIONS

Combined Chinese Office Action and Search Report dated Mar. 28, 2023 in Chinese Patent Application No. 202080101708.X (with Parital Translation), citing reference 15 therein, 14 pages.

FIG. 20 (COMPARATIVE EXAMPLE 3/RETURN OPERATION)

TIME DELAY VALVE AND FLOW RATE CONTROLLER

TECHNICAL FIELD

The present invention relates to a time delay valve and a flow rate controller for performing a delay operation in a fluid circuit.

BACKGROUND ART

Conventionally, various valves (time delay valves) for performing a delay operation have been proposed. Such a time delay valve is used, for example, for two-stage speed control in which a fluid pressure cylinder operated by fluid pressure is switched from a first speed (high speed) to a second speed (low speed). Such two-stage speed control is effective in reducing the impact at the stroke end of the fluid pressure cylinder, shortening the cycle time by increasing the operation speed, and the like.

Various time delay valves have been proposed which utilize the supply pressure of a pilot fluid to operate the valve. In this case, a throttle and a volume portion are used in the delay mechanism, and the switching operation of the valve is performed at the timing when a predetermined amount of pilot fluid is supplied to the volume portion (for example, JP 5632914 B2, JP 4595411 B2, JP 3161965 B2, and JP 2001-050204 A). It is also known to use the above delay mechanism in a two-speed switching flow rate controller (for example, JP 5578502 B2 and JP 5756984 B1).

SUMMARY OF THE INVENTION

However, the conventional time delay valve has a problem that when the supply pressure of the pilot fluid fluctuates, the flow rate of the pilot fluid passing through the throttle of the delay mechanism fluctuates and the timing at which the valve is switched varies.

Therefore, when the time delay valve is used in a place where the pressure tends to fluctuate, such as a pressure line in a factory, the switching timing of the time delay valve varies. As a result, since the operation time of each of the devices using the time delay valve varies, it is necessary to provide a predetermined waiting time in consideration of the variation in the operation of devices, which causes a problem that the cycle time is prolonged.

Therefore, it is an object of the present invention to provide a time delay valve and a flow rate controller capable of suppressing the influence on the switching timing due to the fluctuation of the supply pressure of the pilot fluid.

According to one aspect of the present disclosure, there is provided a time delay valve including a switching valve configured to be switched between a first position and a second position, a biasing member configured to bias the switching valve toward the first position, a drive mechanism configured to bias the switching valve toward the second position under an action of a supply pressure of a pilot fluid, a pilot flow path configured to guide the pilot fluid to the drive mechanism, and a delay mechanism configured to delay switching timing of the switching valve, wherein the delay mechanism includes a delay throttle valve provided in the pilot flow path, and a compensation mechanism configured to bias the switching valve toward the first position under an action of the supply pressure of the pilot fluid.

According to another aspect, there is provided a flow rate controller including a first supply and discharge path configured to supply and discharge fluid to and from one port of a fluid pressure cylinder, a second supply and discharge path configured to supply and discharge fluid to and from another port of the fluid pressure cylinder, an operation switching valve configured to switch and connect a fluid supply source and a fluid discharge unit to the first supply and discharge path and the second supply and discharge path, the fluid supply source being configured to supply a control target fluid and the fluid discharge unit being configured to discharge fluid, and time delay valves provided in the first supply and discharge path and the second supply and discharge path, respectively, wherein each of the time delay valves includes a switching valve configured to be switched between a first position and a second position, a biasing member configured to bias the switching valve toward the first position, a drive mechanism configured to bias the switching valve toward the second position under an action of a supply pressure of a pilot fluid, a pilot flow path configured to guide the pilot fluid to the drive mechanism, and a delay mechanism configured to delay switching timing of the switching valve, and wherein the delay mechanism includes a first throttle valve provided in the pilot flow path, and a compensation mechanism configured to bias the switching valve toward the first position under an action of the supply pressure of the pilot fluid.

According to the time delay valve and the flow rate controller of the above-described aspects, it is possible to suppress the influence on the switching timing due to the fluctuation of the supply pressure of the pilot fluid.

DESCRIPTION OF THE INVENTION

A preferred embodiment of a time delay valve and a flow rate controller according to the present invention will be described in detail below with reference to the accompanying drawings.

First Embodiment

Figure 1:
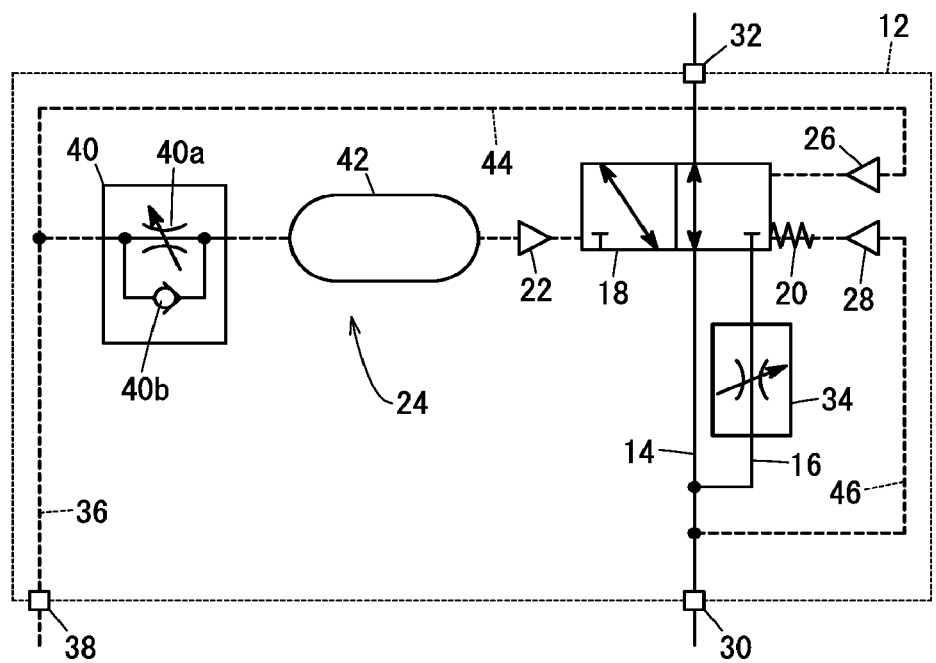
FIG. 1 is a fluid circuit diagram of a time delay valve according to a first embodiment.
Figure 2:
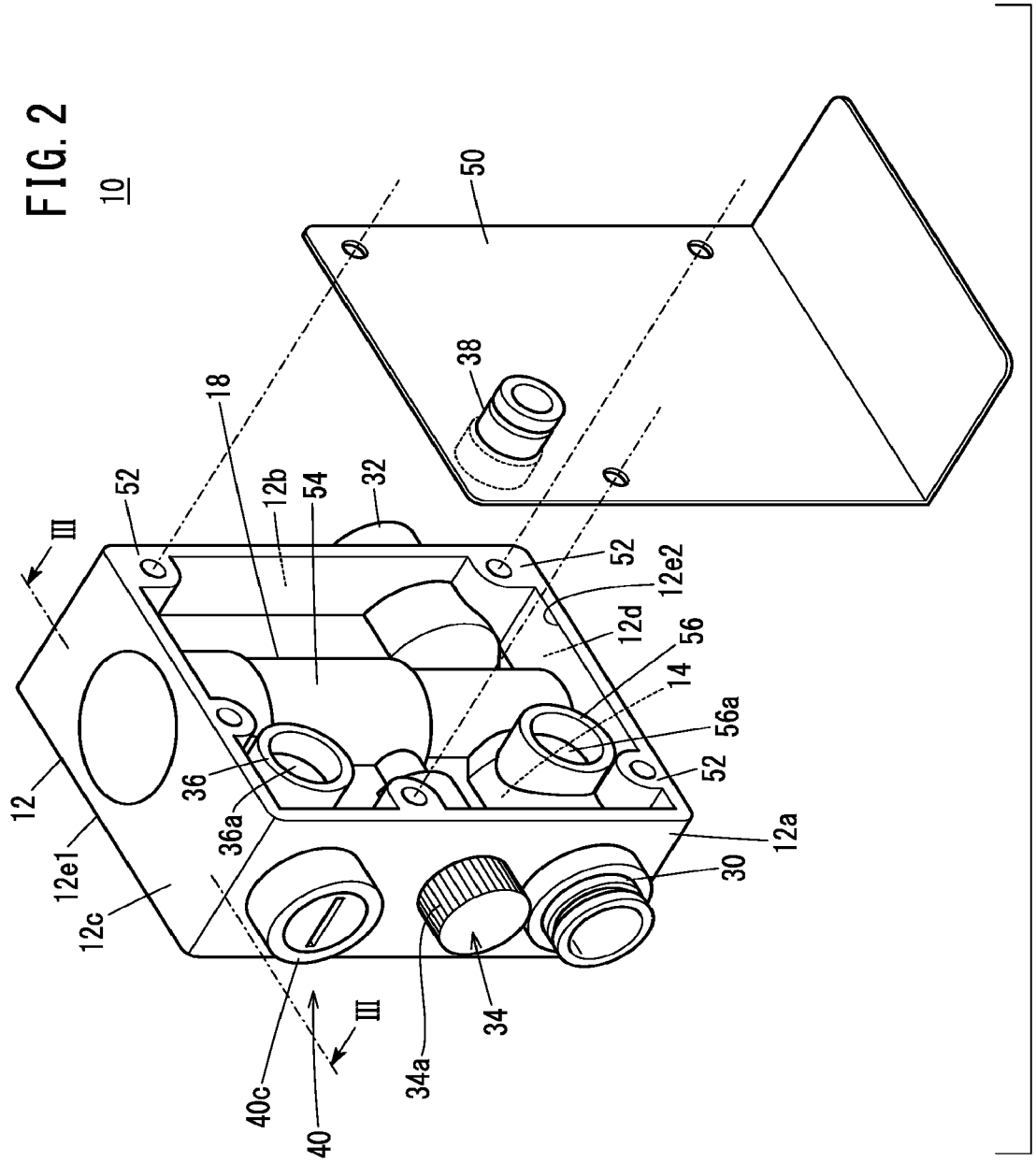
FIG. 2 is a perspective view of the time delay valve of FIG. 1.

A time delay valve 10 of the present embodiment shown in FIGS. 1 and 2 is mounted on a cylinder or a drive circuit of various fluid pressure devices, and is used for a pneumatic device or the like in a production line of a factory. The time delay valve 10 is used to control a flow rate of a control target fluid such as air. The control target fluid and the pilot fluid are not limited to air.

As shown in FIG. 1, the time delay valve 10 of the present embodiment includes, inside a main body 12, a first flow path 14, a second flow path 16, a switching valve 18, a biasing member 20, a drive mechanism 22, a delay mechanism 24, a compensation mechanism 26, and a return mechanism 28. Among them, the first flow path 14 and the second flow path 16 are flow paths through which the control target fluid flows, and are flow paths that connect a first connection port 30 and a second connection port 32 of the main body 12.

The first flow path 14 and the second flow path 16 are flow paths provided in parallel, and a path through which the control target fluid flows is selectively switched between these flow paths, by a switching operation of the switching valve 18. The second flow path 16 is provided with a first throttle valve 34 for throttling a flow rate so as to pass the control target fluid under a condition different from that of the first flow path 14. The first throttle valve 34 may be provided in the first flow path 14 instead of the second flow path 16. Alternatively, the first throttle valve 34 may be provided in both the first flow path 14 and the second flow path 16. Further, the first throttle valve 34 is not limited to a variable throttle valve having a variable flow rate, but may be a fixed throttle valve that allows a fluid to pass therethrough at a constant flow rate.

The switching valve 18 is configured as a three-port valve that can be switched between a first position and a second position. At the first position, the switching valve 18 causes the first connection port 30 and the second connection port 32 to communicate with each other via the first flow path 14. At the second position, the switching valve 18 causes the first connection port 30 and the second connection port 32 to communicate with each other via the second flow path 16. The switching valve 18 is configured to be switched between the first position and the second position by the biasing force of the biasing member 20, the drive mechanism 22, the compensation mechanism 26, and the return mechanism 28.

The biasing member 20 is a member that biases the switching valve 18 toward the first position, and is configured by, for example, an elastic member such as a spring or rubber. In a state in which pilot fluid is not supplied to the switching valve 18, the switching valve 18 is held at the first position by the biasing force of the biasing member 20. The biasing member 20 has such an elastic force that the switching valve 18 is not switched to the second position by its own weight.

The drive mechanism 22 is a member that generates a biasing force that biases the switching valve 18 toward the second position under the action of the pilot fluid. The drive mechanism 22 includes a piston mechanism disposed on an opposite side from the biasing member 20 as will be described later, and generates a biasing force corresponding to the supply pressure of the pilot fluid. The drive mechanism 22 switches the switching valve 18 to the second position at a timing at which its biasing force exceeds the biasing forces of the biasing member 20 and the compensation mechanism 26.

A pilot fluid is supplied to the drive mechanism 22 via a pilot flow path 36. The pilot flow path 36 is a flow path that connects a pilot port 38 of the main body 12 and the drive mechanism 22, and guides the pilot fluid flowing in from the pilot port 38 to the drive mechanism 22.

The delay mechanism 24 includes a delay throttle valve 40 provided in the pilot flow path 36, a volume portion 42 provided downstream of the delay throttle valve 40, and the compensation mechanism 26. The delay throttle valve 40 is provided with a throttle valve 40a by which flow rate can be varied and a check valve 40b, in parallel. The delay throttle valve 40 can adjust the increase speed of the pressure of the pilot fluid acting on the drive mechanism 22 by throttling the flow rate of the pilot fluid flowing into the volume portion 42 via the pilot flow path 36, and can thus adjust the switching timing of the switching valve 18. The volume portion 42 is configured as a volume of the pilot flow path 36 on the downstream side of the delay throttle valve 40 and as a volume of the piston mechanism of the drive mechanism 22. If necessary, a member such as a storage tank may be added.

The compensation mechanism 26 is a member that generates a biasing force biasing the switching valve 18 toward the first position. The compensation mechanism 26 is connected to the pilot port 38 via a compensation flow path 44 that branches off from the pilot flow path 36 on the upstream side of the delay throttle valve 40. The compensation mechanism 26 is supplied with the pilot fluid through the compensation flow path 44. The compensation mechanism 26 generates a biasing force toward the first position having a magnitude corresponding to the supply pressure of the pilot fluid. That is, when the supply pressure of the pilot fluid increases, the biasing force of the compensation mechanism 26 increases. When the supply pressure of the pilot fluid decreases, the biasing force of the compensation mechanism 26 decreases. However, the biasing force of the compensation mechanism 26 rises more quickly than the biasing force of the drive mechanism 22. The biasing force that defines the timing at which the switching valve 18 is switched is increased or decreased in accordance with the supply pressure of the pilot fluid.

The return mechanism 28 is a member that generates a biasing force that biases the switching valve 18 toward the first position. The return mechanism 28 is connected to the first flow path 14 via a return flow path 46. The return mechanism 28 generates a biasing force having a magnitude corresponding to the supply pressure of the control target fluid in the first flow path 14. The amount of the pilot fluid in the volume portion 42 increases or decreases in accordance with the supply pressure of the pilot fluid. The return mechanism 28 stabilizes the return timing at which the switching valve 18 is switched from the second position to the first position by causing the biasing force corresponding to the supply pressure of the pilot fluid (control target fluid) to act on the switching valve 18.

Next, a specific structure of the time delay valve 10 will be described with reference to FIGS. 2 to 4.

As shown in FIG. 2, the main body 12 of the time delay valve 10 is formed in a rectangular frame shape in which a front part 12a, a back part 12b, a top part 12c, and a bottom part 12d are integrated, and both side portions thereof are opening portions 12e1 and 12e2. On both side portions of the main body 12, a plurality of bosses 52 for attaching side plates 50 are provided at predetermined positions of the front part 12a, the back part 12b, the top part 12c, and the bottom part 12d of the main body 12. Another time delay valve 10 may be connected through the opening portions 12e1 and 12e2. In the present embodiment, since a single time delay valve 10 is used, a pair of side plates 50 are attached so as to cover the opening portions 12e1 and 12e2 on the side portions.

The first connection port 30, a flow rate adjustment knob 34a of the first throttle valve 34, and an adjustment knob 40c of the delay throttle valve 40 are disposed on the front part 12a of the main body 12. In addition, the second connection port 32 is provided on the back part 12b. A substantially cylindrical valve housing portion 54 is provided between the top part 12c and the bottom part 12d of the main body 12. The switching valve 18 is housed in the valve housing portion 54.

The first flow path 14 extends from the first connection port 30 on the front part 12a toward the valve housing portion 54. Connection ports 56 extend laterally from side portions of the first flow path 14. Each of the connection ports 56 is formed in a cylindrical shape and extends to a side portion on an opening portion 12e1 side and a side portion on an opening portion 12e2 side. A sealing wall 56a is provided in each of the side portion of the connection port 56 on the opening portion 12e1 side and the side portion thereof on the opening portion 12e2 side. When a hole is drilled in the sealing wall 56a as necessary and a plurality of time delay valves 10 are connected to each other, the hole is used as a connection opening for supplying a pilot fluid or a control target fluid to an adjacent time delay valve 10. When only a single time delay valve 10 is used as in the present embodiment, drilling through the sealing wall 56a on the opening portion 12e1 side and drilling through the sealing wall 56a on the opening portion 12e2 side of the connection ports 56 are not performed, and the connection ports 56 are sealed by the sealing walls 56a.

The first throttle valve 34 is connected to the valve housing portion 54 at a position closer to the top part 12c than the first flow path 14 is. For the first throttle valve 34, the flow rate adjustment knob 34a is provided on the front part 12a, and the flow rate of the second flow path 16 can be adjusted by the flow rate adjustment knob 34a.

The delay throttle valve 40 is connected to the valve housing portion 54 at a position closer to the top part 12c than the first throttle valve 34 is. The pilot flow paths 36 are connected to side portions of the delay throttle valve 40. The pilot flow paths 36 are connected to the valve housing portion 54 via the delay throttle valve 40. The pilot flow paths 36 extend in a cylindrical shape toward the opening portion 12e1 side and the opening portion 12e2 side, and a sealing wall 36a is formed on each of the opening portion 12e1 side and the opening portion 12e2 side. Among these sealing walls 36a, a hole is drilled in the sealing wall 36a on the opening portion 12e2 side, and the pilot port 38 is connected to the pilot flow path 36 on the opening portion 12e2 side. When the side plate 50 is assembled, the pilot port 38 protrudes to the outside of the side plate 50, and a tube member can be connected to the pilot port 38. The pilot fluid is supplied to the pilot port 38 at predetermined timing.

Figure 3:
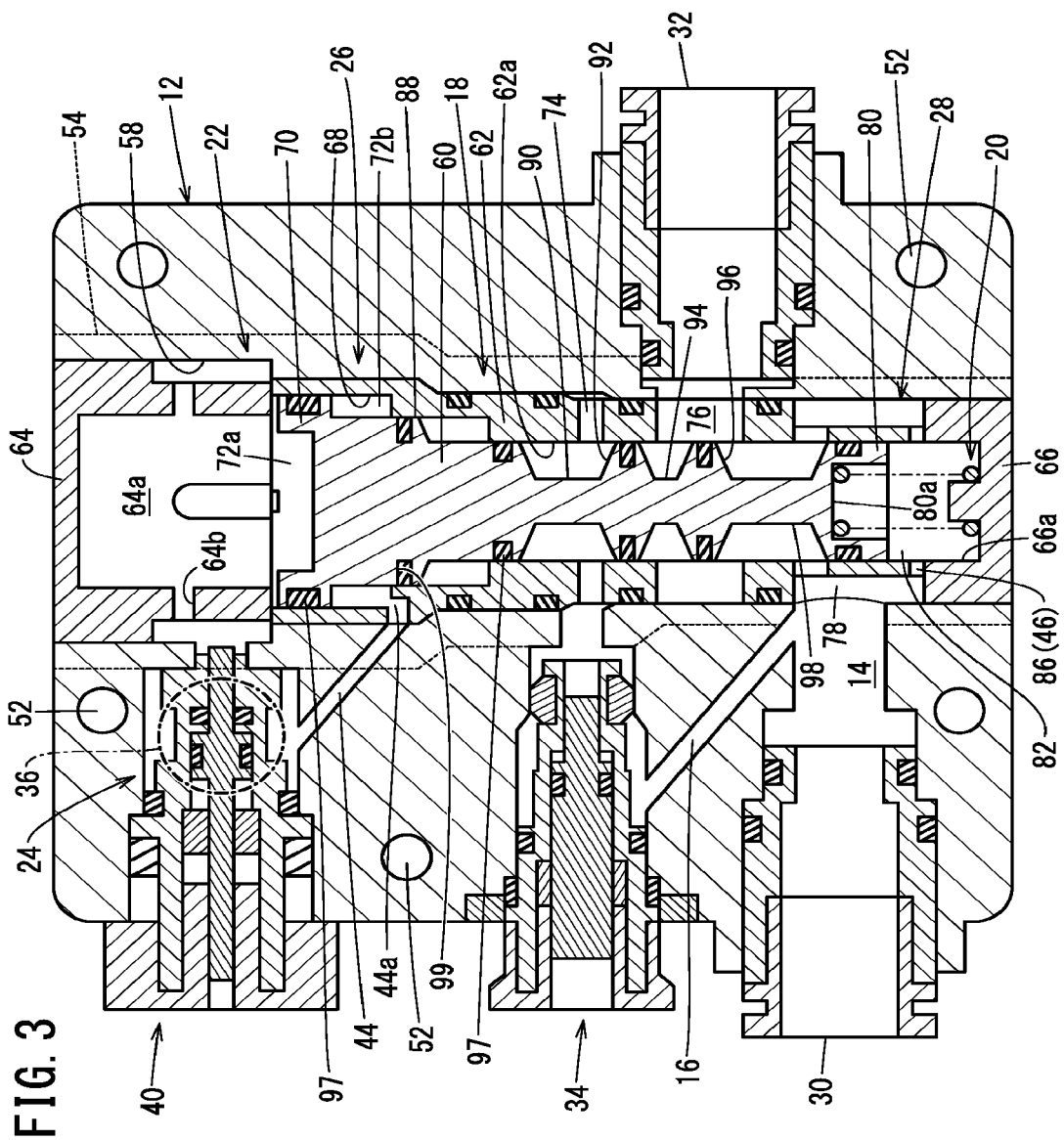
FIG. 3 is a cross-sectional view of the time delay valve of FIG. 2 taken along line III-III.

As shown in FIG. 3, the switching valve 18 is configured as a spool valve in which a spool 60 is housed inside the valve housing portion 54. The valve housing portion 54 has therein a through hole 58 penetrating from the top part 12c to a bottom part 12d side of the main body 12. Both ends of the through hole 58 are sealed with end caps 64, 66. The spool 60 and a sleeve 62 housing the spool 60 are accommodated in the through hole 58 between the end caps 64 and 66.

The end cap 64 is fitted into an end portion of the through hole 58 on a top part 12c side. A storage chamber 64a for storing the pilot fluid is formed inside the end cap 64. The storage chamber 64a communicates with the delay throttle valve 40 through a hole portion 64b and constitutes a part of the volume portion 42 for storing the pilot fluid.

The sleeve 62 is fitted into the through hole 58 between the end caps 64, 66. In the sleeve 62, a sliding hole 62a is formed penetrating from the top part 12c side to the bottom part 12d side. The spool 60 is slidably disposed in the sliding hole 62a.

A drive piston chamber 68 is formed in the end portion of the sleeve 62 on the top part 12c side. The drive piston chamber 68 is a portion for housing a drive piston 70 formed at one end of the spool 60. The drive piston chamber 68 is partitioned by the drive piston 70 into a first empty chamber 72a on the top part 12c side and a second empty chamber 72b on the bottom part 12d side. The first empty chamber 72a of the drive piston chamber 68 communicates with the storage chamber 64a of the end cap 64. An opening portion 44a of the compensation flow path 44 is formed in the second empty chamber 72b of the drive piston chamber 68, and the second empty chamber 72b communicates with the compensation flow path 44.

The sleeve 62 is formed with a first cutout hole 74 communicating with the first throttle valve 34, a second cutout hole 76 communicating with the second connection port 32, and a third cutout hole 78 communicating with the first flow path 14. The first cutout hole 74, the second cutout hole 76, and the third cutout hole 78 are formed to penetrate through the sleeve 62 in a thickness direction.

A return piston chamber 82 for slidably housing a return piston 80 is formed at an end portion of the sleeve 62 on the bottom part 12d side. The return piston chamber 82 is sealed by the end cap 66 fitted into the through hole 58 from the bottom part 12d side. The return piston chamber 82 is partitioned by the return piston 80 into an empty chamber on the end cap 66 side and an empty chamber on the top part 12c side. An empty chamber of the return piston chamber 82 on the end cap 66 side communicates with the first flow path 14 via a fourth cutout hole 86 constituting the return flow path 46. An empty chamber of the return piston chamber 82 on the top part 12*c* side communicates with the first flow path 14.

The return piston 80 is formed at an end portion of the spool 60 on the bottom part 12*d* side, and an end surface of the return piston 80 serves as a fourth pressure receiving surface 80*a*. The fourth pressure receiving surface 80*a* receives the supply pressure of the control target fluid flowing into the return piston chamber 82 through the return flow path 46, and generates a biasing force that urges the spool 60 toward the first position.

The biasing member 20 is housed in an empty chamber between the return piston 80 and the end cap 66 in the return piston chamber 82. The biasing member 20 is, for example, a spring in the shape of a coil, and is in contact with the fourth pressure receiving surface 80*a* of the return piston 80. The biasing member 20 urges the fourth pressure receiving surface 80*a* (spool 60) toward the first position on the top part 12*c* side by its elastic force. The elastic force (biasing force) of the biasing member 20 is set to a value greater than the weight of the spool 60, and prevents the spool 60 from moving toward the bottom part 12*d* side (second position side) when not in use, i.e., when neither the pilot fluid nor the control target fluid is supplied.

Figure 4:
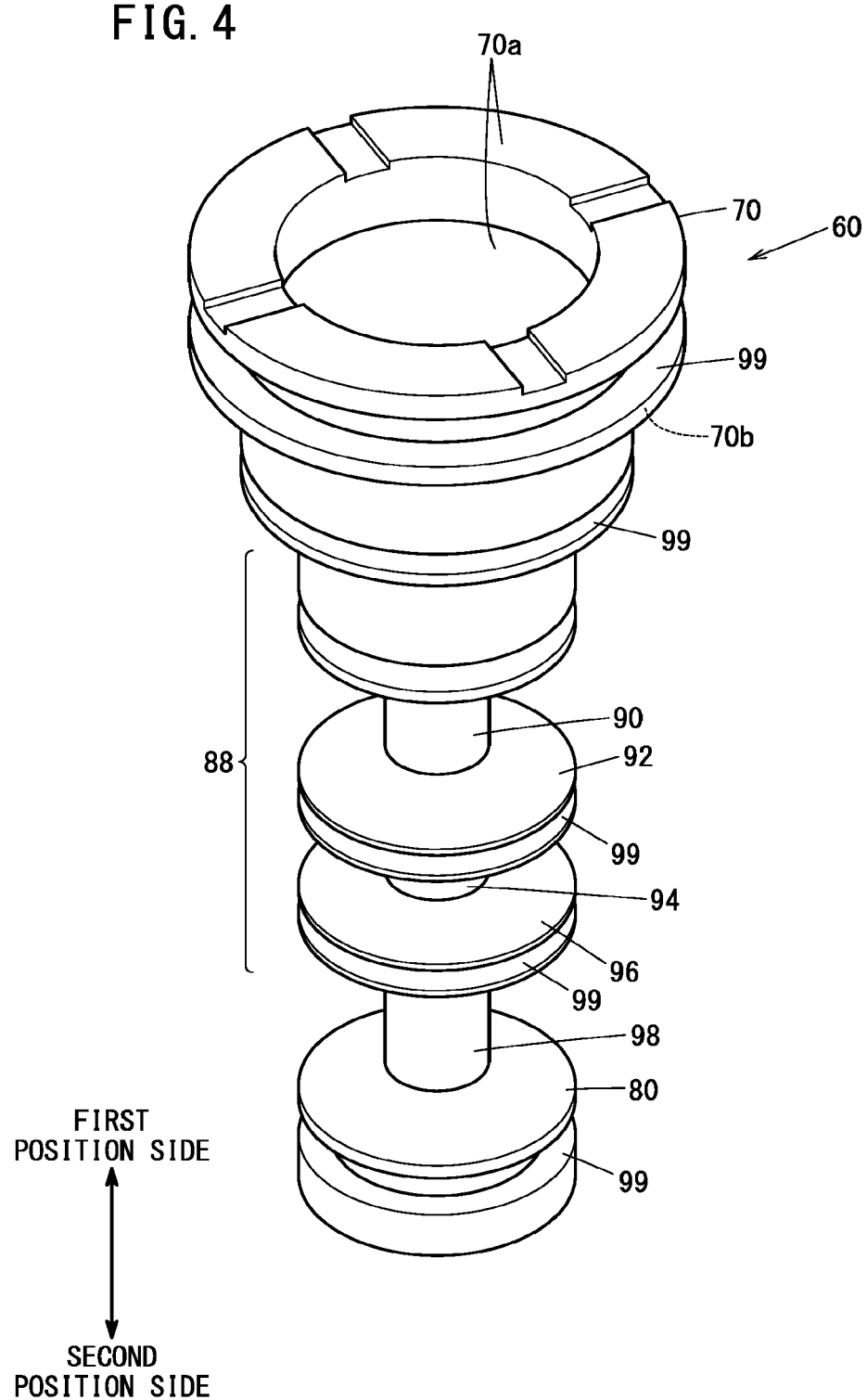
FIG. 4 is a perspective view of a spool of FIG. 3.

As shown in FIG. 4, the drive piston 70 is formed at one end of the spool 60 on the first position side (top part 12*c* side). An end surface of the drive piston 70 serves as a first pressure receiving surface 70*a*, and generates a biasing force that biases the spool 60 toward the second position upon receiving a supply force of the pilot fluid.

A sliding portion 88 having a diameter smaller than that of the drive piston 70 is formed on the second position side of the drive piston 70. Further, a second pressure receiving surface 70*b* is formed at a stepped portion between the sliding portion 88 and the drive piston 70. The second pressure receiving surface 70*b* is formed on an opposite side from the first pressure receiving surface 70*a*, and generates a biasing force that biases the spool 60 toward the first position by receiving the supply force of the pilot fluid. The second pressure receiving surface 70*b* constitutes a part of the compensation mechanism 26. Since the area of the second pressure receiving surface 70*b* is smaller than the area of the first pressure receiving surface 70*a*, when the internal pressure of the storage chamber 64*a* sufficiently increases, the biasing force of the first pressure receiving surface 70*a* exceeds the biasing forces of the second pressure receiving surface 70*b* and the biasing member 20.

The sliding portion 88 extends toward the second position side (bottom part 12*d* side). The sliding portion 88 is formed with a first recessed portion 90, a first partition wall 92, a second recessed portion 94, a second partition wall 96, a third recessed portion 98, and the return piston 80 in this order from the first position side. A plurality of packing housing grooves 99 are formed in predetermined portions of the spool 60. As shown in FIG. 3, an O-ring 97 is mounted in each of the packing housing grooves 99 to seal a gap between the spool 60 and the sleeve 62.

As shown in FIG. 3, when the spool 60 is in the first position, the first recessed portion 90 communicates with the first cutout hole 74, the second recessed portion 94 communicates with the second cutout hole 76, and the third recessed portion 98 communicates with the third cutout hole 78. Further, the first partition wall 92 air-tightly (liquid-tightly) partitions the first cutout hole 74 and the second cutout hole 76. At this time, the second partition wall 96 is disposed at the position of the second cutout hole 76, and the second cutout hole 76 and the third cutout hole 78 communicate with each other through the third recessed portion 98. The first connection port 30 and the second connection port 32 are connected to each other through the first flow path 14.

On the other hand, when the spool 60 is at the second position on the bottom part 12*d* side, the first partition wall 92 is disposed at the position of the second cutout hole 76, and the first cutout hole 74 and the second cutout hole 76 communicate with each other through the first recessed portion 90. At this time, the second partition wall 96 comes into close contact with an inner peripheral surface of the sleeve 62 between the second cutout hole 76 and the third cutout hole 78, and communication between the second cutout hole 76 and the third cutout hole 78 is blocked. When the spool 60 is in the second position, the first connection port 30 and the second connection port 32 are connected through the second flow path 16 and the first throttle valve 34.

The time delay valve 10 according to the present embodiment is configured as described above, and the operation thereof will be described below.

Figure 5:
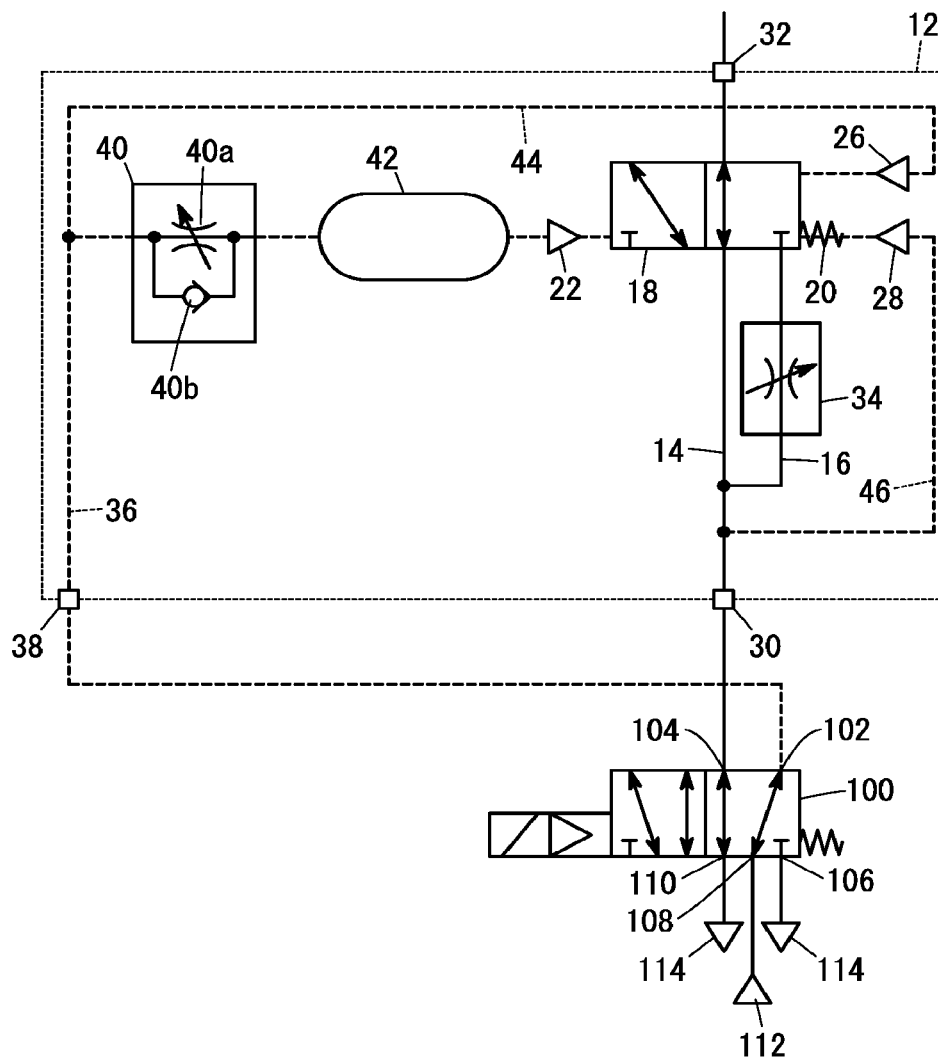
FIG. 5 is a fluid circuit diagram illustrating an example of connection of a drive circuit to the time delay valve of FIG. 1.

As shown in FIG. 5, the time delay valve 10 is connected to an operation switching valve 100 and is used as a driving device for a fluid pressure device such as an air cylinder. The illustrated fluid circuit is a fluid circuit in which the flow rate of the control target fluid discharged from a fluid discharge unit 114 is throttled after a predetermined delay time using the time delay valve 10.

The operation switching valve 100 is a five-port valve and has ports 102 to 110. The pilot port 38 is connected to the first port 102, and the first connection port 30 is connected to the second port 104. The fluid discharge unit 114 is connected to the third port 106 and the fifth port 110, and a fluid supply source 112 is connected to the fourth port 108. The fluid supply source 112 is, for example, a pressure line, an air compressor or the like in a factory.

The operation switching valve 100 is switched between a first position and a second position. In the first position of the operation switching valve 100, the first port 102 and the fourth port 108 are connected to each other, and the second port 104 and the fifth port 110 are connected to each other. That is, the fluid supply source 112 is connected to the pilot port 38 to supply the pilot fluid, and the fluid discharge unit 114 is connected to the first connection port 30. Then, the pilot fluid is supplied to the pilot flow path 36 through the pilot port 38.

In the time delay valve 10 in the initial state, the switching valve 18 is disposed at the first position by the biasing force of the biasing member 20, and the first connection port 30 and the second connection port 32 communicate with each other through the first flow path 14. A part of the pilot fluid flows into the compensation mechanism 26 through the compensation flow path 44 branched from the pilot flow path 36. Another part of the pilot fluid flows into the volume portion 42 (storage chamber 64*a*) at a predetermined flow rate through the delay throttle valve 40 to gradually increase the pressure of the pilot fluid acting on the drive mechanism 22.

Figure 6:
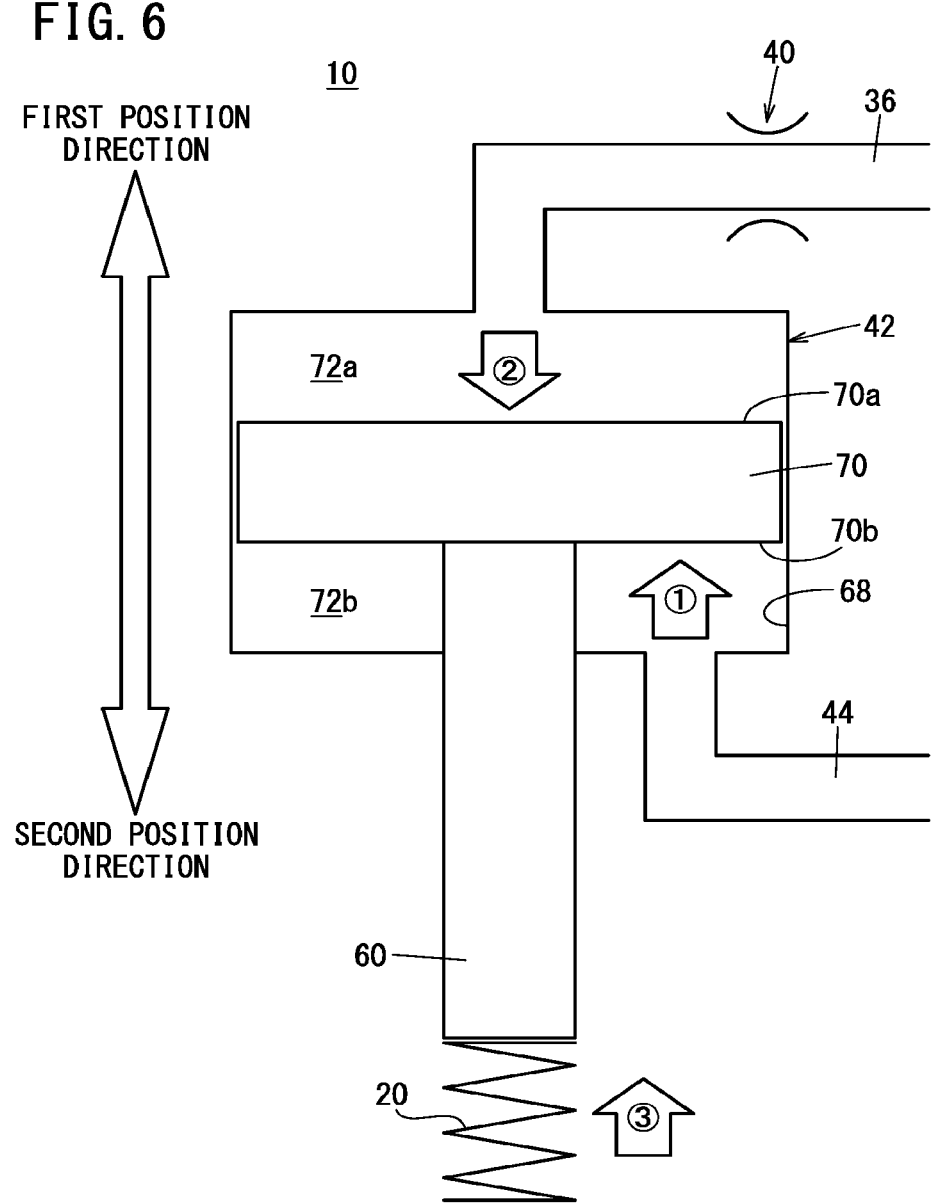
FIG. 6 is an explanatory diagram illustrating the operation of the time delay valve of FIG. 1.

As shown in FIG. 6, a biasing force 1 due to a pressure acting on the second pressure receiving surface 70*b* (compensation mechanism 26) of the drive piston 70, a biasing force 2 due to a pressure acting on the first pressure receiving surface 70*a* (drive mechanism 22), and a biasing force 3 due to the biasing member 20, act on the spool 60. The spool 60 (the switching valve 18) is switched to the second position at timing when the biasing force 2 in the second position direction becomes larger than a combined force of the biasing force 1 in the first position direction and the biasing force 3.

When the switching valve 18 is switched to the second position, the first connection port 30 and the second connection port 32 shown in FIG. 5 are connected to each other through the second flow path 16, and the flow rate of the control target fluid is regulated by the first throttle valve 34. As described above, the time delay valve 10 operates such that the switching valve 18 is switched after a predetermined delay time elapses from the supply of the pilot fluid.

Here, when the pressure of the fluid supply source 112 increases, the flow rate of the pilot fluid passing through the delay throttle valve 40 of the pilot flow path 36 increases, the rising speed of the charge pressure of the volume portion 42 becomes fast, and the increase of the biasing force 2 becomes fast. Conversely, when the pressure when the pressure of the fluid supply source 112 decreases, the flow rate of the pilot fluid passing through the delay throttle valve 40 decreases, and the increase of the biasing force 2 is delayed. Therefore, there is a concern that the timing of the switching operation of the switching valve 18 varies due to the fluctuation of the pressure of the fluid supply source 112.

Therefore, in the time delay valve 10 according to the present embodiment, the biasing force 1 is generated by applying the supply pressure of the pilot fluid to the second pressure receiving surface 70b, prior to the increase of the biasing force 2. Since the magnitude of the biasing force 1 is proportional to the pressure of the pilot fluid, the biasing force 1 acts to compensate the increasing speed of the biasing force 2. That is, as the pressure of the fluid supply source 112 increases, the biasing force 1 increases accordingly. Then, the magnitude of the biasing force 2 required for switching the spool 60 increases, and the influence of the increase in the increasing speed of the urging force 2 is cancelled, so that it is possible to suppress the variation of the switching timing (delay time) of the spool 60.

In addition, when the pressure from the fluid supply source 112 decreases, the supply pressure of the pilot fluid acting on the second pressure receiving surface 70b also decreases. As a result, the biasing force 1 decreases, and the spool 60 can be switched with a smaller biasing force 2. As a result, the influence due to the decrease in the increase rate of the biasing force 2 is canceled out, and the variation in the switching timing (delay time) of the spool 60 can be suppressed.

In addition, the time delay valve 10 of the present embodiment can stabilize the timing of the switching operation of the spool 60 even in the return operation. When the operation switching valve 100 shown in FIG. 5 is switched to the second position, the first port 102 and the third port 106 are connected, and the second port 104 and the fourth port 108 are connected. That is, the fluid supply source 112 is connected to the first connection port 30 of the time delay valve 10, and the fluid discharge unit 114 is connected to the pilot port 38.

The pilot fluid stored in the volume portion 42 is discharged from the fluid discharge unit 114 via the check valve 40b and the pilot flow path 36. Then, the spool 60 (the switching valve 18) returns to the first position at timing when the pressure of the pilot fluid acting on the drive mechanism 22 falls below the predetermined value and the biasing force 2 in FIG. 6 falls below the biasing force 3 of the biasing member 20. However, since the amount of the pilot fluid stored in the volume portion 42 increases or decreases in accordance with the pressure fluctuation of the fluid supply source 112 which is the supply pressure of the pilot fluid, the timing at which the spool 60 (the switching valve 18) returns to the first position is affected by the pressure of the fluid supply source 112.

In the present embodiment, a part of the control target fluid in the first connection port 30 is supplied to the return piston chamber 82 of the return mechanism 28 through the return flow path 46 communicating with the first connection port 30. The return piston 80 of the return mechanism 28 generates a biasing force toward the first second position with a magnitude corresponding to the supply pressure of the control target fluid (the pressure of the fluid supply source 112). Since the biasing force of the return mechanism 28 is superimposed on the biasing force of the biasing member 20, the biasing force of the return mechanism 28 acts so as to cancel the change in the amount of the pilot fluid stored in the volume portion 42. As a result, the time delay valve 10 can suppress variation in the timing of the return operation due to the fluctuation in the pressure of the fluid supply source 112.

Figure 7:
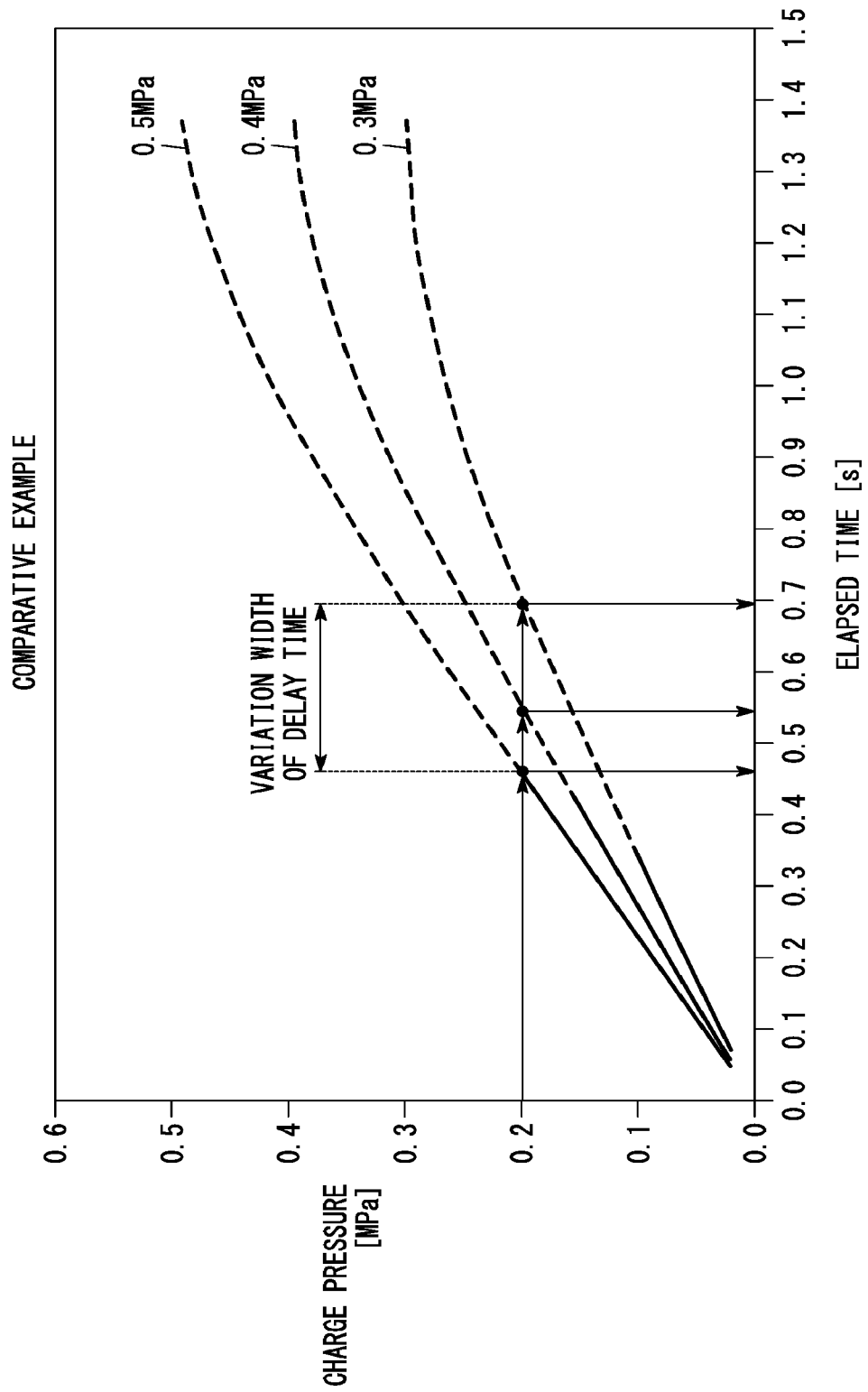
FIG. 7 is a graph illustrating the influence on the delay time (switching timing) by the fluctuation in the charge pressure of the pilot air of the time delay valve according to Comparative Example.

FIG. 7 is a diagram illustrating a transition of the charge pressure of the pilot air in the volume portion 42 of the time delay valve according to Comparative Example and a state of variation of the switching timing (delay time). In the time delay valve of Comparative Example, the compensation flow path 44 of FIG. 6 is opened to the atmosphere so that the biasing force 1 corresponding to the pressure of the pilot fluid is not generated.

Here, an example is shown in which the supply pressure of the pilot fluid from the fluid supply source 112 are varied by ±0.1 MPa with respect to a reference pressure of 0.4 MPa. As the pressure of the fluid supply source 112 increases, the charge pressure of the volume portion 42 increases more rapidly. Also, as the pressure of the fluid supply source 112 decreases, the increase in the charge pressure of the volume portion 42 slows. In the case where only the biasing force 3 of the biasing member 20 acts on the spool 60, the spool 60 is switched when the constant charge pressure 0.2 MPa is reached, but the timing (delay time) of the switching operation greatly varies due to the variation in the increasing speed of the charge pressure.

Figure 8:
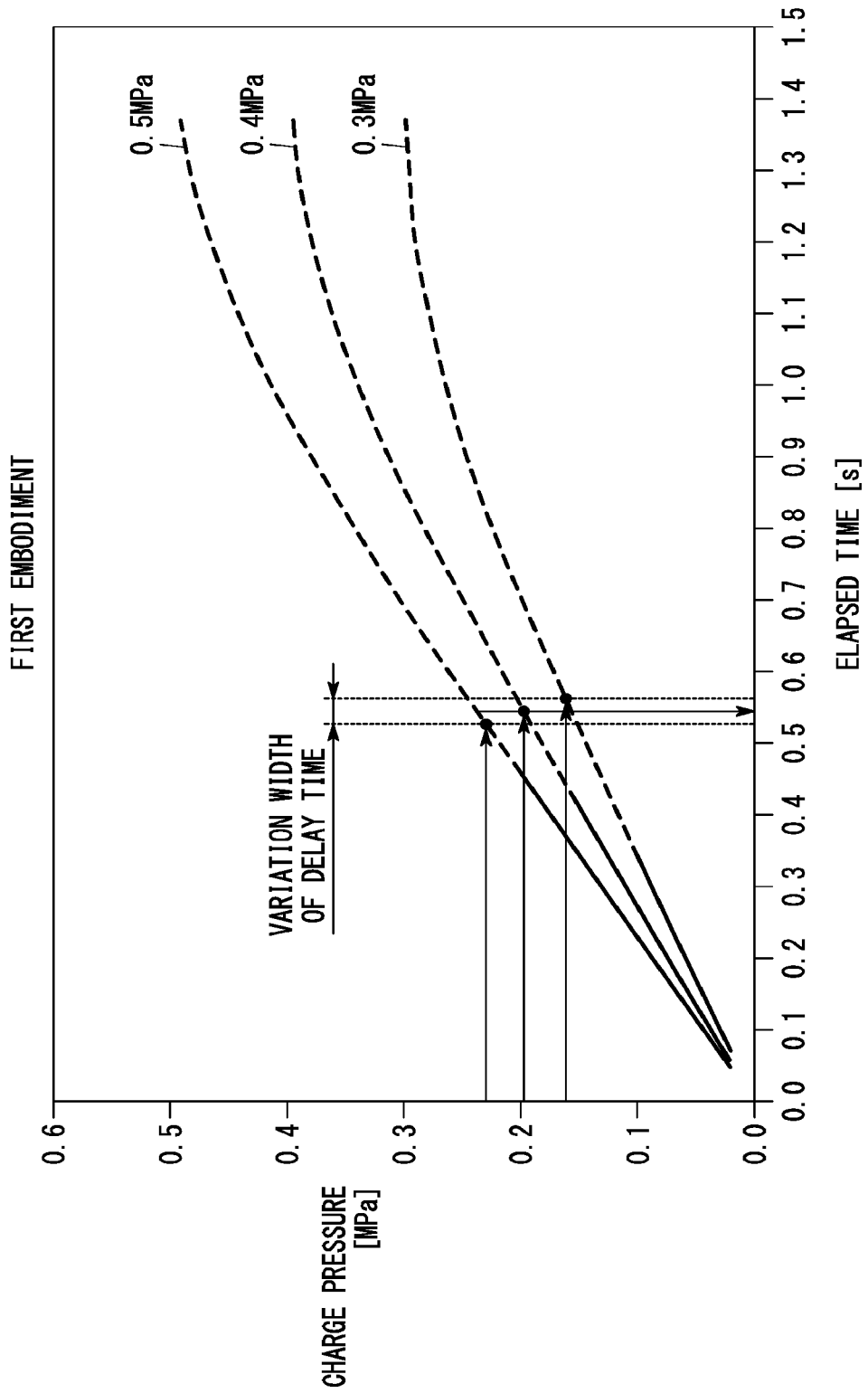
FIG. 8 is a graph showing the influence on the delay time (switching timing) by the fluctuation in the charge pressure of the pilot air of the time delay valve according to the first embodiment.

On the other hand, as shown in FIG. 8, in the time delay valve 10 of the present embodiment, since the charge pressure of the volume portion 42 when the spool 60 is switched is increased or decreased by the compensation mechanism 26, the variation width of the delay time can be suppressed.

The time delay valve 10 of the present embodiment has the following effects.

The time delay valve 10 according to the present embodiment includes the switching valve 18 configured to be switched between the first position and the second position; the biasing member 20 configured to bias the switching valve 18 toward the first position; the drive mechanism 22 configured to bias the switching valve 18 toward the second position under the action of the supply pressure of the pilot fluid; the pilot flow path 36 configured to guide the pilot fluid to the drive mechanism 22; and the delay mechanism 24 configured to delay switching timing of the switching valve 18, wherein the delay mechanism 24 includes: the delay throttle valve 40 provided in the pilot flow path 36; and the compensation mechanism 26 configured to bias the switching valve 18 toward the first position under the action of the supply pressure of the pilot fluid.

According to the configuration described above, the biasing force 1 (see FIG. 6) corresponding to the pressure of the pilot fluid can be applied to the switching valve 18 by the compensation mechanism 26. Thus, in accordance with the fluctuations of the supply pressure of the pilot fluid, the biasing force 2 of the drive mechanism 22 can be changed when the switching valve 18 is switched from the first position to the second position, and the variation width of the delay time due to the fluctuation in the supply pressure of the pilot fluid can be suppressed.

In the time delay valve 10, the compensation mechanism 26 may include a piston mechanism configured to generate a biasing force opposite to that of the drive mechanism 22 under the action of the supply pressure of the pilot fluid. In accordance with this configuration, it is possible to generate the biasing force 1 corresponding to the supply pressure of the pilot fluid.

In the time delay valve 10 described above, the compensation mechanism 26 is supplied with the pilot fluid through the compensation flow path 44 branched from the pilot flow path 36 on the upstream side of the delay throttle valve 40. With this configuration, the supply pressure of the pilot fluid can be quickly applied to the compensation mechanism 26, and the switching timing of the switching valve 18 can be stabilized.

The time delay valve 10 described above may further include the first flow path 14 configured to allow communication at the first position of the switching valve 18, the second flow path 16 configured to allow communication at the second position of the switching valve 18, and the first throttle valve 34 provided in at least one of the first flow path 14 or the second flow path 16. According to this configuration, the flow rate of the control target fluid can be switched.

The time delay valve 10 described above may further include the return mechanism 28 configured to generate a biasing force opposite to that of the drive mechanism 22, and the return flow path 46 branched from the first flow path 14 or the second flow path 16 and connected to the return mechanism 28. According to this configuration, even when the supply pressure of the pilot fluid fluctuates, the timing of the return operation of the switching valve 18 can be stabilized.

In the time delay valve 10 described above, the switching valve 18 includes the spool 60 and the sleeve 62 in which the spool 60 slides, the drive mechanism 22 includes the drive piston chamber 68 provided at one end of the spool 60 and the drive piston 70 configured to partition the drive piston chamber 68 into the first empty chamber 72a on the first position side and the second empty chamber 72b on the second position side, and the drive piston 70 includes the first pressure receiving surface 70a on a side of the first empty chamber 72a, the first pressure receiving surface 70a being configured to receive the supply pressure of the pilot fluid to generate the biasing force toward the second position. By integrating the spool 60 and the drive piston 70 in this way, the device configuration is simplified.

In the above-described time delay valve 10, the drive piston 70 may be formed integrally with the spool 60, and the compensation mechanism 26 may include in the drive piston 70 the second pressure receiving surface 70b that faces the second empty chamber 72b and is provided on an opposite side from the first pressure receiving surface 70a. According to this configuration, since the compensation mechanism 26 is provided in the drive piston 70, the device configuration is simplified.

In the time delay valve 10 described above, the area of the second pressure receiving surface 70b is smaller than the area of the first pressure receiving surface 70a. Thus, the pilot fluid can generate a biasing force for switching the switching valve 18 from the first position to the second position.

In the above-described time delay valve 10, the return mechanism 28 may include the return piston 80 formed at the other end of the spool 60 and the return piston chamber 82 configured to house the return piston 80. According to this configuration, the return piston 80 of the return mechanism 28 is integrated with the spool 60, and the device configuration is simplified.

In the time delay valve 10 described above, the biasing member 20 may be disposed in the return piston chamber 82. According to this configuration, the time delay valve 10 can be miniaturized.

Modification of First Embodiment

Figure 9:
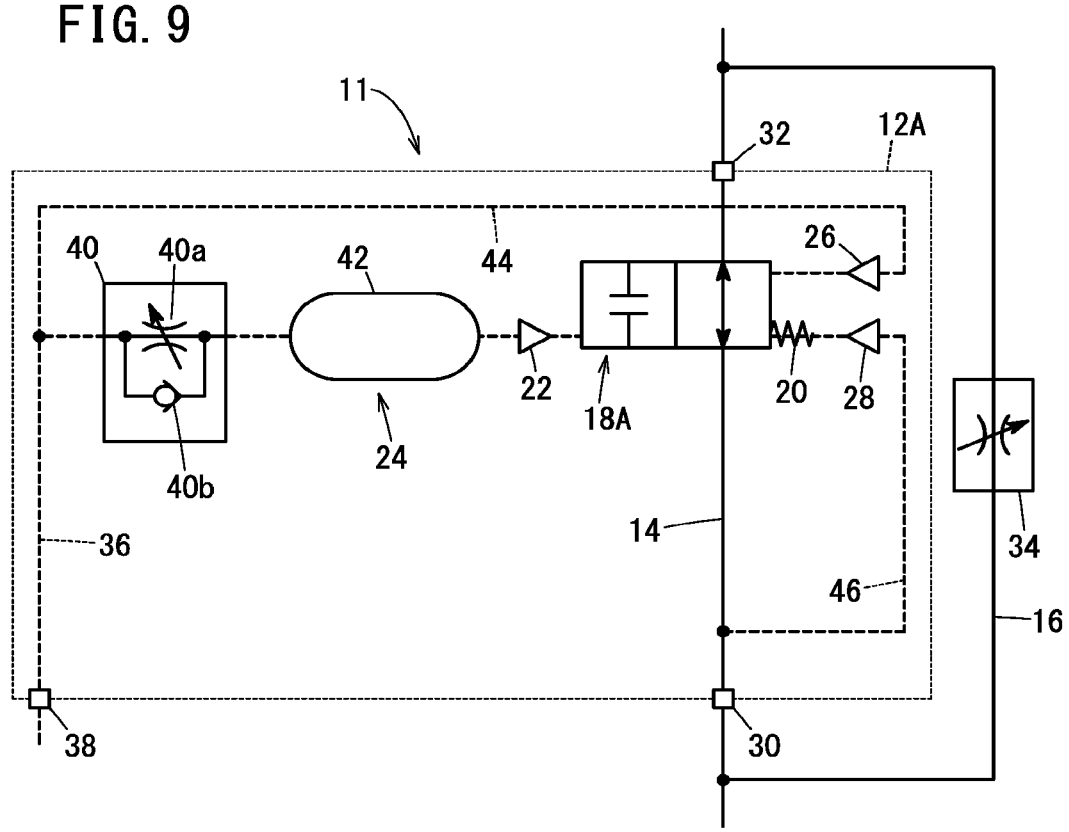
FIG. 9 is a fluid circuit diagram of a time delay valve according to a modification of the first embodiment.

As shown in FIG. 9, a time delay valve 11 according to the present modification does not have the second flow path 16 inside a main body 12A, and the second flow path 16 and the first throttle valve 34 are externally provided. In the configuration of the time delay valve 11 in FIG. 9, the same components as those of the time delay valve 10 described with reference to FIGS. 1 to 6 are designated by the same reference numerals, and detailed description of such features will be omitted.

As shown in FIG. 9, the time delay valve 11 has the first flow path 14 that connects the first connection port 30 and the second connection port 32 of the main body 12A, and a switching valve 18A is provided in the first flow path 14. The switching valve 18A is switchable between a first position and a second position. In the first position, the switching valve 18A allows the fluid in the first flow path 14 to flow therethrough, and prevents the fluid in the first flow path 14 from flowing therethrough, in the second position.

Similarly to the switching valve 18 according to the first embodiment, the switching valve 18A is biased to the first position by the biasing member 20. When the supply of the pilot fluid to the drive mechanism 22, the delay mechanism 24, and the compensation mechanism 26 is started, the switching valve 18A is switched to the second position after a predetermined delay period (delay time) has elapsed, and the passage of the control target fluid through the first flow path 14 is blocked.

When the second flow path 16 having the first throttle valve 34 is connected to the time delay valve 11 in parallel, as an external member, the flow rate of the control target fluid can be throttled after the lapse of a predetermined delay time, and the same function as that of the time delay valve 10 can be obtained.

Similarly to the time delay valve 10 according to the first embodiment, the time delay valve 11 of the present modification can suppress variation of the switching timing (delay time) due to fluctuation of the supply pressure of the pilot fluid.

The switching valve 18A of the time delay valve 11 is not limited to a two-port valve, but may be a five-port valve or the like. The device provided in the second flow path 16 is not limited to the first throttle valve 34, and various devices may be connected in place of the first throttle valve 34.

Second Embodiment

Figure 10:
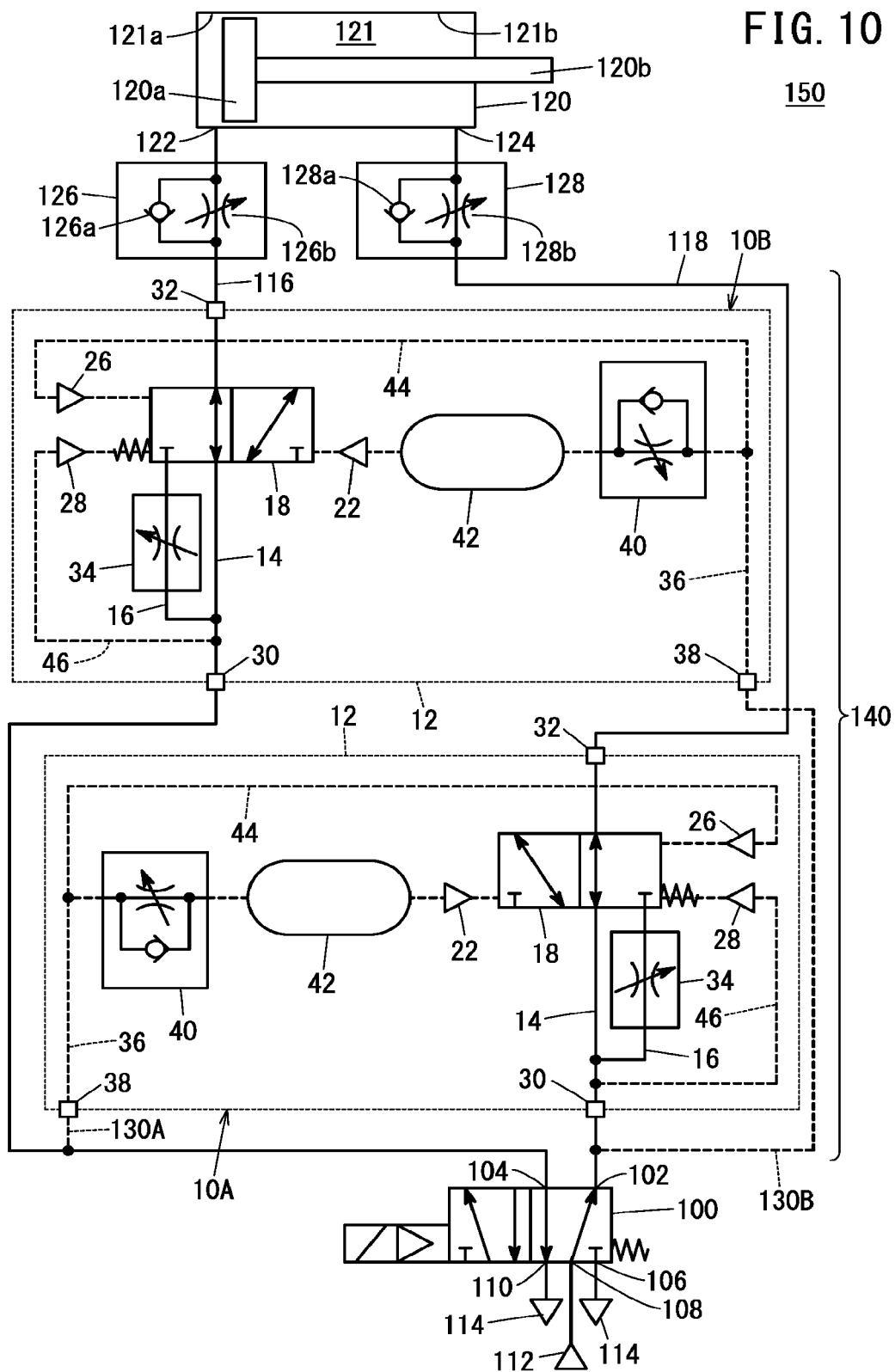
FIG. 10 is a fluid circuit diagram of a flow rate controller according to a second embodiment.

In the present embodiment, a flow rate controller 150 using the time delay valve 10 according to the first embodiment will be described. As shown in FIG. 10, the flow rate controller 150 constitutes a fluid circuit for driving a fluid pressure cylinder 120. The flow rate controller 150 includes a first module 10A and a second module 10B, both of which have the same structure as that of the time delay valve 10 of FIG. 1. In the configurations of the first module 10A and the second module 10B, the same components as those of the time delay valve 10 of FIG. 1 are designated by the same reference numerals, and detailed description of such features will be omitted.

As shown in FIG. 10, the fluid pressure cylinder 120 is a double acting type cylinder, and a piston 120*a* is provided inside a cylinder chamber 121. The piston 120*a* divides the cylinder chamber 121 of the fluid pressure cylinder 120 into a head-side empty chamber 121*a* and a rod-side empty chamber 121*b*. Fluid is supplied to and discharged from the head-side empty chamber 121*a* through a head-side port 122, and fluid is supplied to and discharged from the rod-side empty chamber 121*b* through a rod-side port 124. The piston 120*a* is displaced in the axial direction while sliding on the inner wall of the cylinder chamber 121 by the fluid (control target fluid) supplied to and discharged from the head-side port 122 and the rod-side port 124. A piston rod 120*b* is connected to the piston 120*a*, and the piston rod 120*b* is displaced integrally with the piston 120*a*.

The flow rate controller 150 has a function of performing two-stage speed control for switching the speed of the piston 120*a* (and the piston rod 120*b*) of the fluid pressure cylinder 120 from a first speed which is a higher speed to a second speed which is a lower speed. The flow rate controller 150 can be suitably used when it is required to reduce the impact at the stroke end of the fluid pressure cylinder 120 and to shorten the cycle time by realizing a high-speed operation. Hereinafter, the specific structure of the flow rate controller 150 will be described.

The flow rate controller 150 includes a first supply and discharge path 116 connected to the head-side port 122, a second supply and discharge path 118 connected to the rod-side port 124, the operation switching valve 100 that switches and connects the fluid supply source 112 and the fluid discharge unit 114 to the first supply and discharge path 116 and the second supply and discharge path 118, speed adjusting units 126 and 128 that regulate the first operation speed of the fluid pressure cylinder 120, and the first module 10A and the second module 10B that regulate the second operation speed.

The first speed and the second module 10B are connected to the first supply and discharge path 116. The first speed adjusting unit 126 is a member that regulates an operation speed at the high first speed in a return stroke in which the piston rod 120*b* of the fluid pressure cylinder 120 is pulled in. The first speed includes a check valve 126*a* and a throttle valve 126*b*. The check valve 126*a* is connected in parallel with the throttle valve 126*b* in such a direction as to allow the fluid supplied to the fluid pressure cylinder 120 to pass therethrough without resistance. When the piston 120*a* of the fluid pressure cylinder 120 moves to the head side, the first speed adjusting unit 126 regulates the operation speed of the fluid pressure cylinder 120 by throttling the flow rate of the fluid discharged from the head-side port 122 by the throttle valve 126*b*. That is, the first speed adjusting unit 126 constitutes a meter-out speed controller that regulates the operation speed by the fluid discharged from the fluid pressure cylinder 120.

The second module 10B is connected between the first speed adjusting unit 126 and the operation switching valve 100 in the first supply and discharge path 116. In the second module 10B, the second connection port 32 is connected to the first speed adjusting unit 126, and the first connection port 30 is connected to the operation switching valve 100. After a lapse of a predetermined delay time from the start of the return stroke of the fluid pressure cylinder 120, the second module 10B switches the flow path of the control target fluid from the first flow path 14 to the second flow path 16 to reduce the flow rate of the control target fluid, thereby setting to the operation speed to the low second speed. The pilot flow path 36 of the second module 10B is connected to the second supply and discharge path 118 via a second intersection flow path 130B. That is, the pilot fluid of the second module 10B is supplied from the second supply and discharge path 118 on the opposite side.

The second speed adjusting unit 128 and the first module 10A are connected to the second supply and discharge path 118. The second speed adjusting unit 128 is configured in the same manner as the first speed adjusting unit 126, and configures a meter-out speed controller that allows the flow in the direction of being supplied to the fluid pressure cylinder 120 to pass therethrough without resistance and regulates the flow in the opposite direction. The second speed adjusting unit 128 regulates an operation speed at the high first speed in a drive stroke in which the piston rod 120*b* of the fluid pressure cylinder 120 is extended.

The first module 10A is connected between the second speed adjusting unit 128 and the operation switching valve 100 in the second supply and discharge path 118. The configuration of the first module 10A is similar to that of the second module 10B. The pilot flow path 36 of the first module 10A is connected to the first supply and discharge path 116 via a first intersection flow path 130A. As described above, the pilot flow paths 36 of the first module 10A and the second module 10B are connected to the supply and discharge paths 116 and 118, respectively, on the opposite sides so as to cross each other.

Note that the first speed adjusting unit 126 and the second speed adjusting unit 128 are not limited to meter-out speed controllers, and may be configured as meter-in speed controllers by connecting the check valves 126*a* and 128*a* in opposite directions.

The operation switching valve 100 is similar to the operation switching valve 100 described with reference to FIG. 5. The first port 102 of the operation switching valve 100 is connected to the second supply and discharge path 118, the second port 104 is connected to the first supply and discharge path 116, the third port 106 and the fifth port 110 are connected to the fluid discharge unit 114, and the fourth port 108 is connected to the fluid supply source 112.

The circuit configuration of the flow rate controller 150 according to the present embodiment is as described above. Further, the first module 10A and the second module 10B may be configured as an integrated valve unit 140. Hereinafter, the valve unit 140 will be described with reference to FIGS. 11 and 12.

Figure 11:
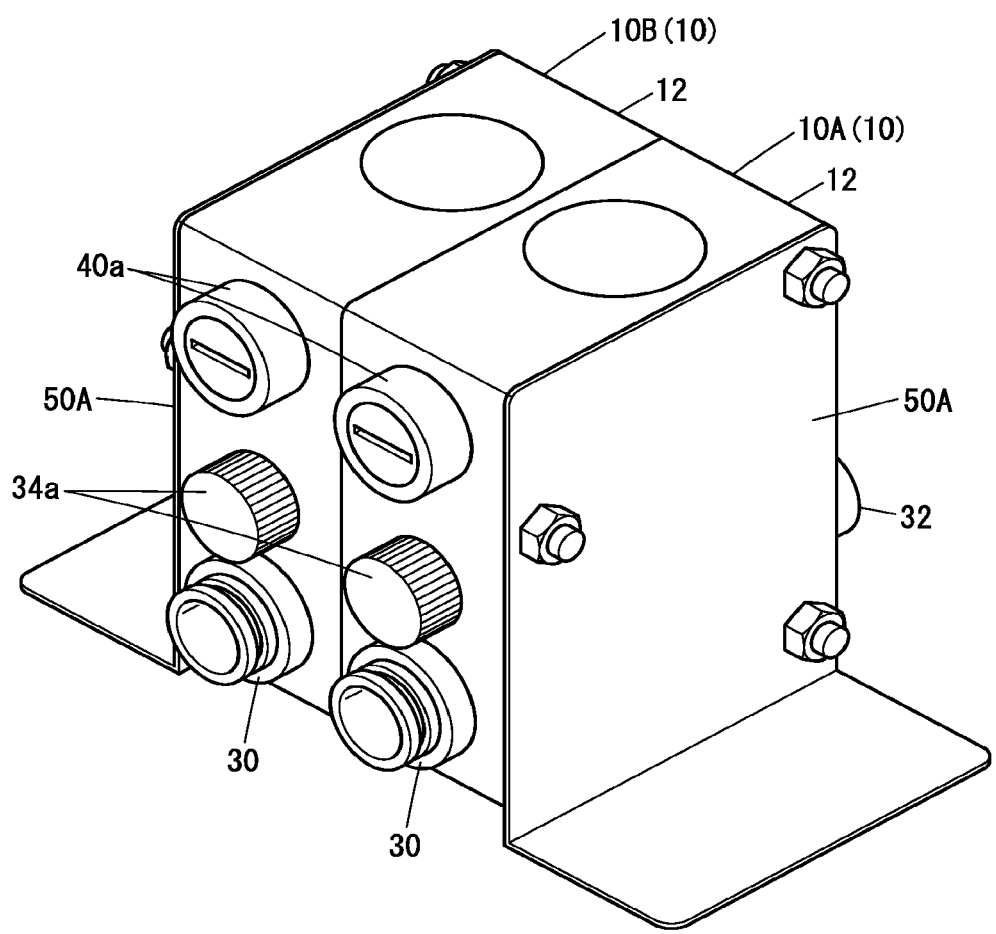
FIG. 11 is a perspective view of the flow rate controller according to the second embodiment.
Figure 12:
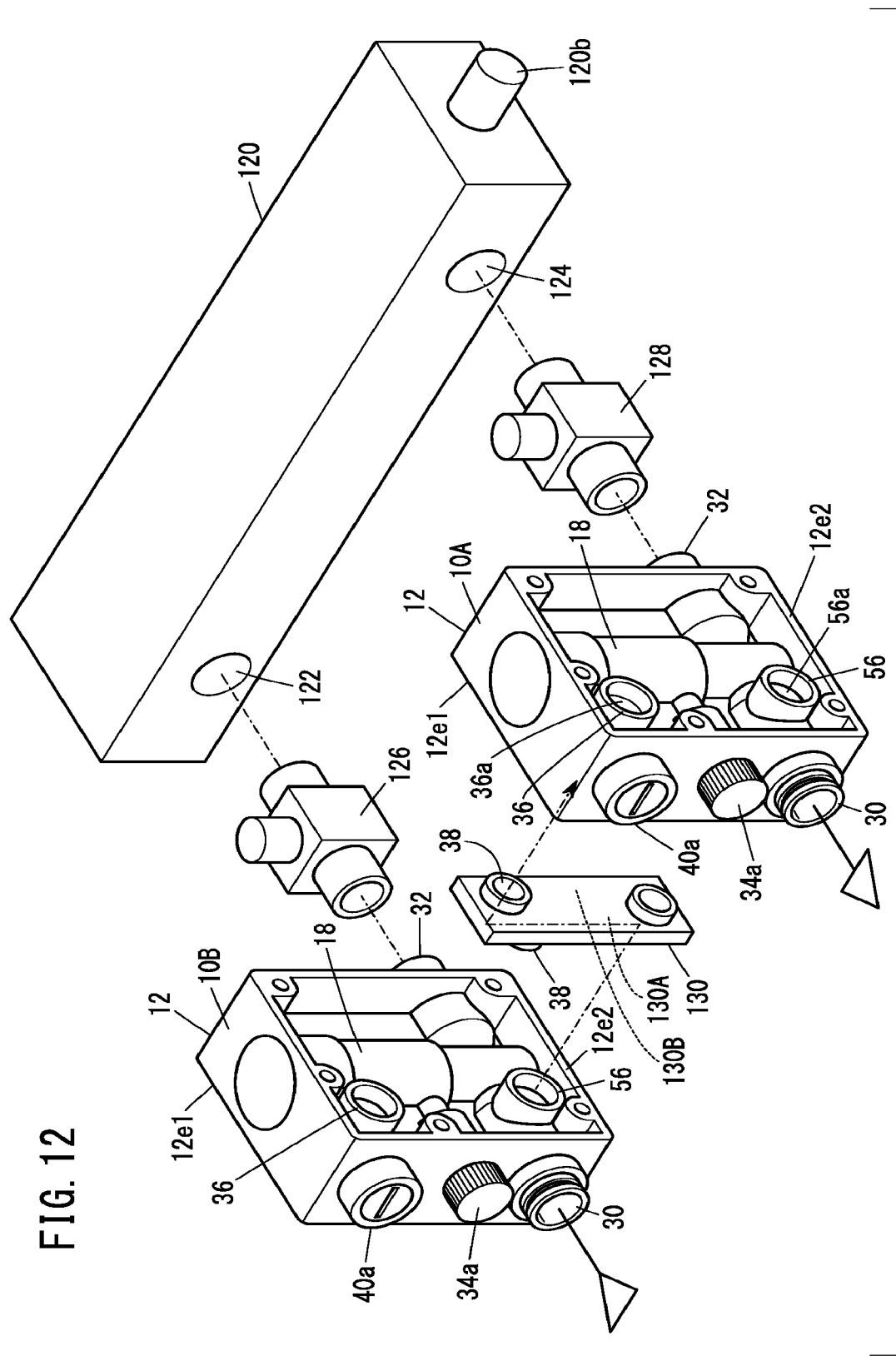
FIG. 12 is a schematic diagram illustrating an example of connection arrangement to the flow rate controller of FIG. 11 and a fluid pressure cylinder.

As shown in FIG. 11, the valve unit 140 is configured by connecting two modules, i.e., the first module 10A and the second module 10B, each having the body 12. The internal configuration of each of the first module 10A and the second module 10B is the same as that of the time delay valve 10 in FIG. 2. However, as shown in FIG. 12, a flow path connecting member 130 is provided in order to connect the pilot flow paths 36 of the first module 10A and the second module 10B to the supply and discharge paths 116 and 118 on the opposite side so as to cross each other.

The flow path connecting member 130 includes the first intersection flow path 130A that connects the connection port 56 of the second module 10B and the pilot flow path 36 of the first module 10A, and the second intersection flow path 130B that connects the connection port 56 of the first module 10A and the pilot flow path 36 of the second module 10B. The flow path connecting member 130 is connected to the pilot flow paths 36 so as to be sandwiched between the first module 10A and the second module 10B. In the second module 10B, respective holes are drilled in the sealing wall 56a of the connection port 56 on an opening portion 12e2 side and the sealing wall 36a of the pilot flow path 36 on the opening portion 12e2 side. In addition, in the first module 10A, respective holes are drilled in the sealing wall 56a of the connection port 56 on an opening portion 12e1 side and the sealing wall 36a of the pilot flow path 36 on the opening portion 12e1 side.

As shown in FIG. 11, both side portions of the first module 10A and the second module 10B are covered with side plates 50A, and connected by bolts. A sealing member (not shown) is provided at a portion of the side plate 50A corresponding to the pilot flow path 36, and the opening portion of the pilot flow path 36 is sealed by the side plate 50A.

The flow rate controller 150 according to the present embodiment is configured as described above, and the operations and actions will be described below.

Figure 13:
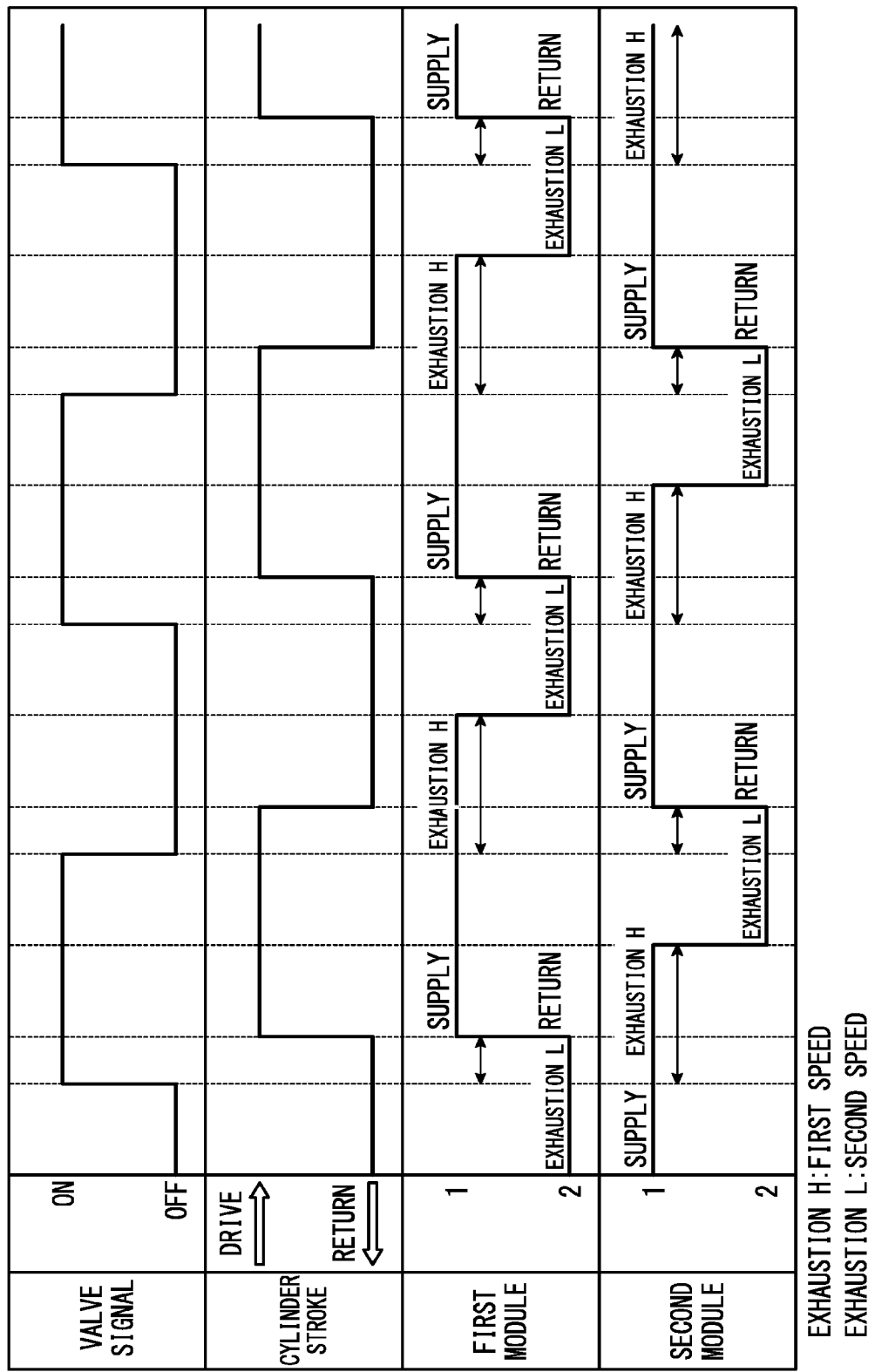
FIG. 13 is a timing chart illustrating the operation of the flow rate controller of FIG. 10.

In FIG. 13, the horizontal axis indicates the passage of time, and the operation of controlling the flow rate of the control target fluid is performed in accordance with the switching operation of the operation switching valve 100. A valve signal indicates the switching state of the operation switching valve 100 of the flow rate controller 150. In an "ON" state, the first supply and discharge path 116 is connected to the fluid supply source 112, and in an "OFF" state, the second supply and discharge path 118 is connected to the fluid supply source 112.

A cylinder stroke indicates a stroke direction of the fluid pressure cylinder 120, "DRIVE" indicates that a drive stroke for extending the piston rod 120b is performed, and "RETURN" indicates that a return stroke for pulling in the piston rod 120b is performed.

In the first module 10A and the second module 10B in FIG. 13, "1" indicates that the spool 60 is at the first position, and "2" indicates that the spool 60 is at the second position. That is, "1" in the first module 10A and the second module 10B indicates that the flow path is the first flow path 14, and "2" in the first module 10A and the second module 10B indicates that the flow path is the second flow path 16. Each of the ranges indicated by arrows in the drawing is a delay time until the spools 60 of the first module 10A and the second module 10B are switched due to switching of the operation switching valve 100, and is operation timing in which the influence of supply pressure of the pilot fluid may be exerted.

Hereinafter, the operation of the flow rate controller 150 when the valve signal of the operation switching valve 100 is switched from OFF to ON will be described.

Figure 14:
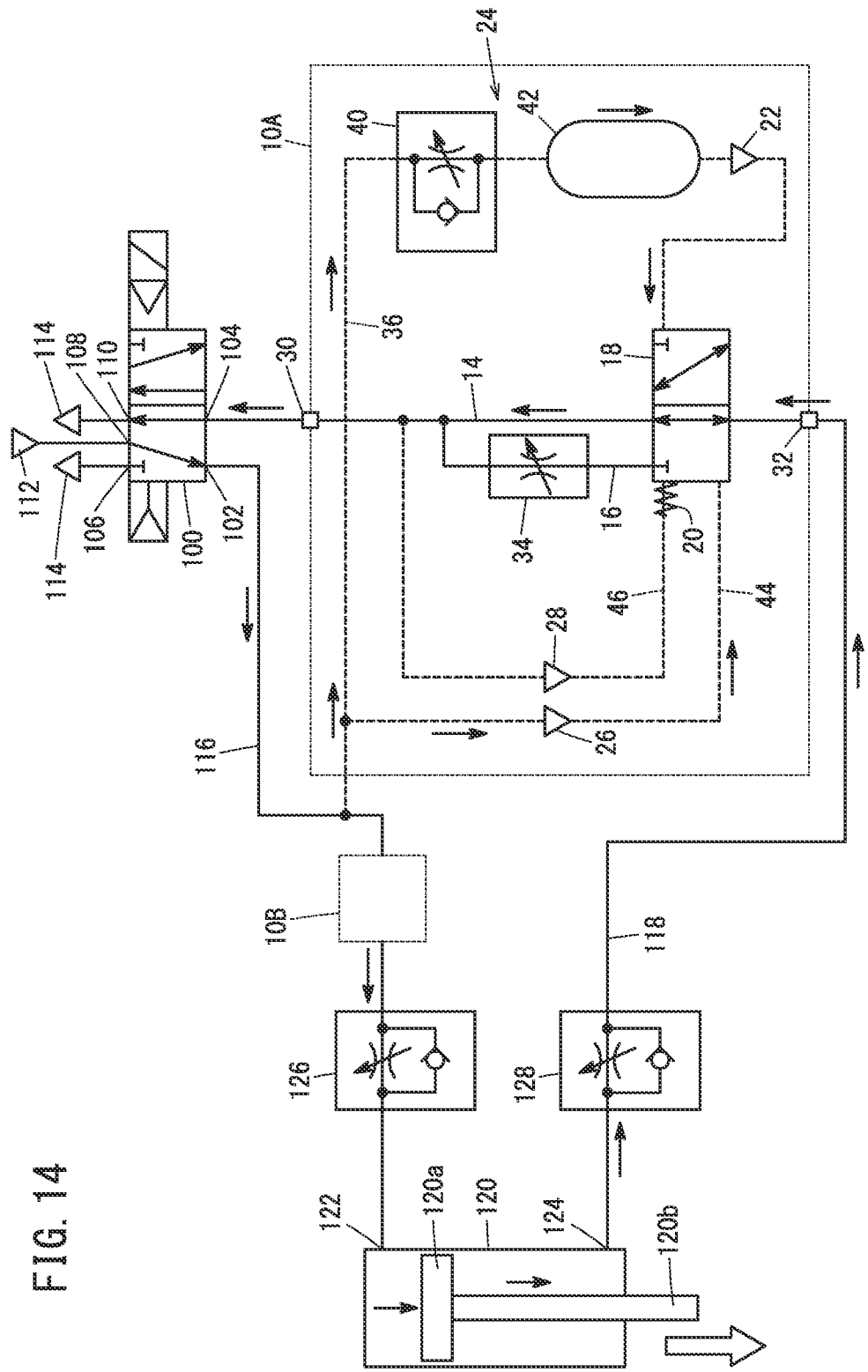
FIG. 14 is a fluid circuit diagram illustrating the operation of the first module of the flow rate controller of FIG. 10 (part 1)

As shown in FIG. 14, when the valve signal of the operation switching valve 100 is switched from OFF to ON, the first port 102 and the fourth port 108 of the operation switching valve 100 are connected to each other, and the first supply and discharge path 116 is connected to the fluid supply source 112. The control target fluid is supplied to the fluid pressure cylinder 120 via the second module 10B to start the drive stroke. Note that the operation of the first supply and discharge path 116 and the second module 10B during the drive stroke is the same as the operation of the first module 10A of the second supply and discharge path 118 during the return stroke described with reference to FIGS. 18 and 19, and thus the description thereof is omitted here.

Immediately before the valve signal of the operation switching valve 100 is switched from OFF to ON, the switching valve 18 of the first module 10A is located at the first position which is the initial position, and the pilot fluid is released from the drive mechanism 22 and the volume portion 42. As shown in FIG. 14, at the first position of the switching valve 18, the flow path of the control target fluid in the first module 10A is the first flow path 14, and the flow rate of the fluid discharged via the second supply and discharge path 118 is regulated only by the second speed adjusting unit 128.

When the signal of the operation switching valve 100 is switched from OFF to ON, the pilot fluid in the first supply and discharge path 116 flows into the pilot flow path 36 through the first intersection flow path 130A. A portion of the pilot fluid is supplied to the compensation mechanism 26 through the compensation flow path 44, and the compensation mechanism 26 generates a biasing force having a magnitude corresponding to the supply pressure of the pilot fluid. The pilot fluid in the pilot flow path 36 flows into the volume portion 42 while being regulated by the delay throttle valve 40, and the pressure of the pilot fluid acting on the drive mechanism 22 gradually increases.

Figure 15:
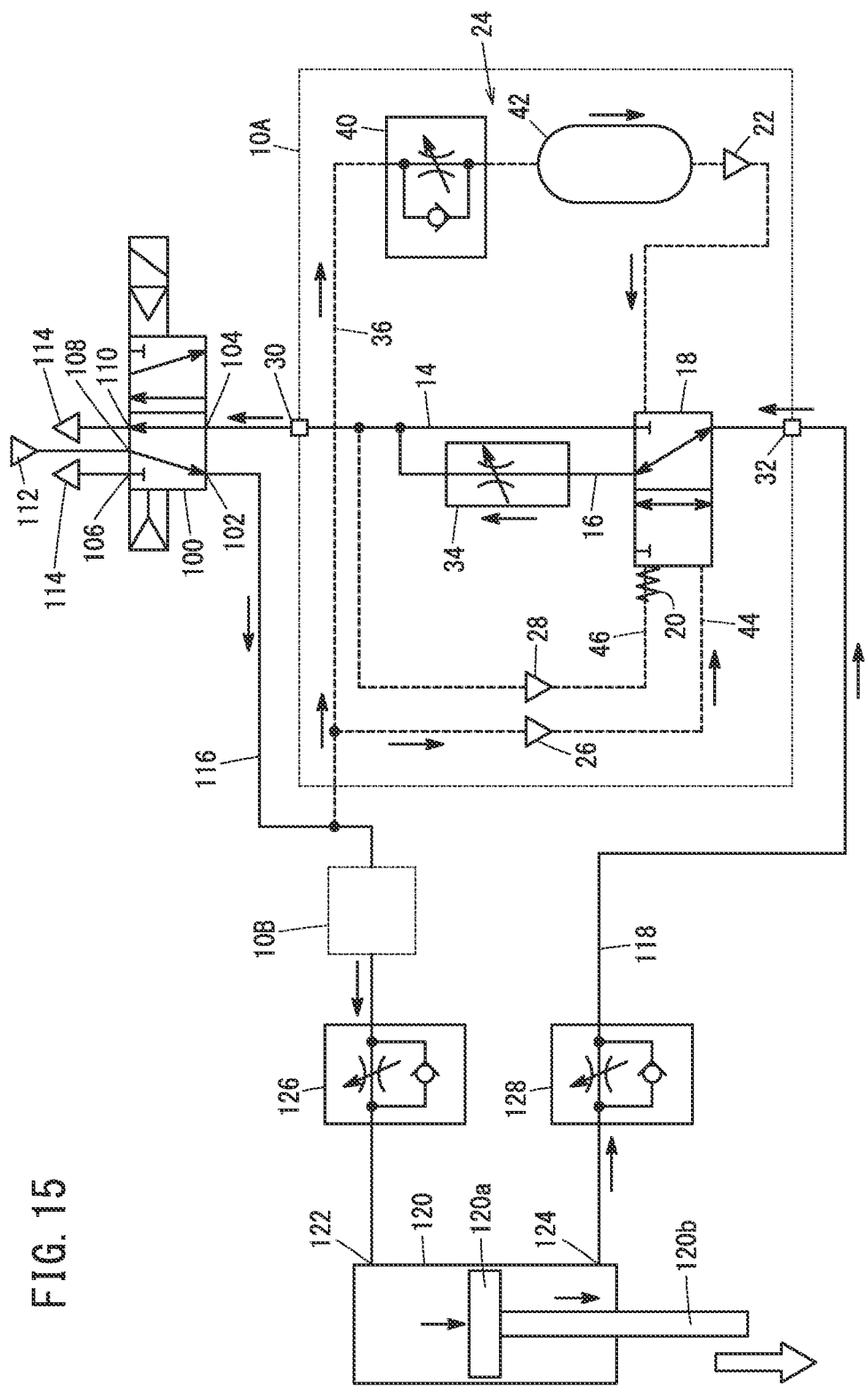
FIG. 15 is a fluid circuit diagram illustrating the operation of the first module of the flow rate controller of FIG. 10 (part 2)

At timing when the biasing force of the drive mechanism 22 exceeds the biasing forces of the biasing member 20 and the compensation mechanism 26, the switching valve 18 is switched to the second position as shown in FIG. 15. The flow rate of the fluid discharged via the first supply and discharge path 116 is further throttled by the first throttle valve 34 provided in the second flow path 16 of the first module 10A in addition to the second speed adjusting unit 128. As a result, the operation speed of the fluid pressure cylinder 120 is switched to the low second speed.

Here, with reference to FIGS. 16 and 17, a description will be given of results obtained by examining the charging characteristics indicating changes in charge pressures, which are pressures of the pilot fluid acting on the drive mechanism 22 of the first module 10A, and loci indicating changes over time in the stroke positions of the fluid pressure cylinder 120, with respect to each of Comparative Example 2 and the present embodiment. Here, the results of supplying compressed air at pressures of 0.3 MPa, 0.4 MPa, and 0.5 MPa from the fluid supply source 112 are shown.

Figure 16:
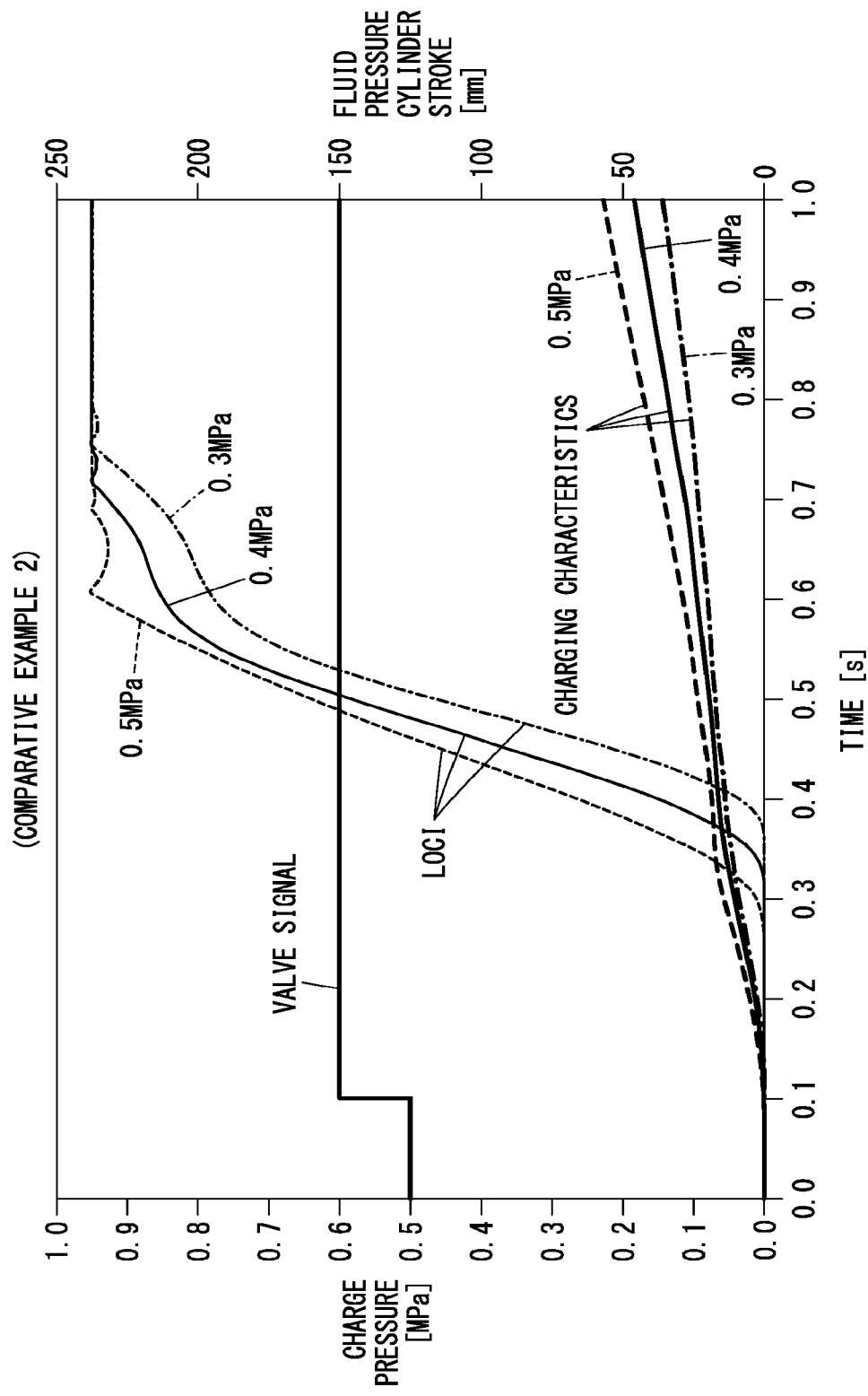
FIG. 16 is a graph illustrating loci of a fluid pressure cylinder connected to a flow rate controller according to Comparative Example 2 and charging characteristics of a first module according to Comparative Example 2.

Comparative Example 2 shown in FIG. 16 shows a result of a case where the flow rate controller is configured by a time delay valve not including the compensation mechanism 26. Attention is paid to the loci of the fluid pressure cylinder 120 when the flow rate controller of Comparative Example 2 is used. In this flow rate controller, the delay throttle valve 40 is adjusted so that the pressure of the fluid supply source 112 becomes optimum at 0.4 MPa. However, if the fluid supply source 112 increases or decreases by ±0.1 MPa, the adjustment becomes improper, causing bouncing or the like at the end of the stroke of the fluid pressure cylinder 120 and increasing the variation in the timing of the end of the stroke. As described above, in the flow rate controller of Comparative Example 2 that does not include the compensation mechanism 26, the variation in the stroke end time of the fluid pressure cylinder 120 becomes large.

The fluid pressure cylinder 120 is used by being incorporated in a production line of a factory. If the variation in the stroke end time of the fluid pressure cylinder 120 is large, there is a concern that interference may occur between a member connected to the fluid pressure cylinder 120 and other devices. From the viewpoint of preventing such interference, it is necessary to provide a relatively large safety margin when setting the valve signal for operating the fluid pressure cylinder 120. As a result, the cycle time of the fluid pressure cylinder 120 is increased.

Figure 17:
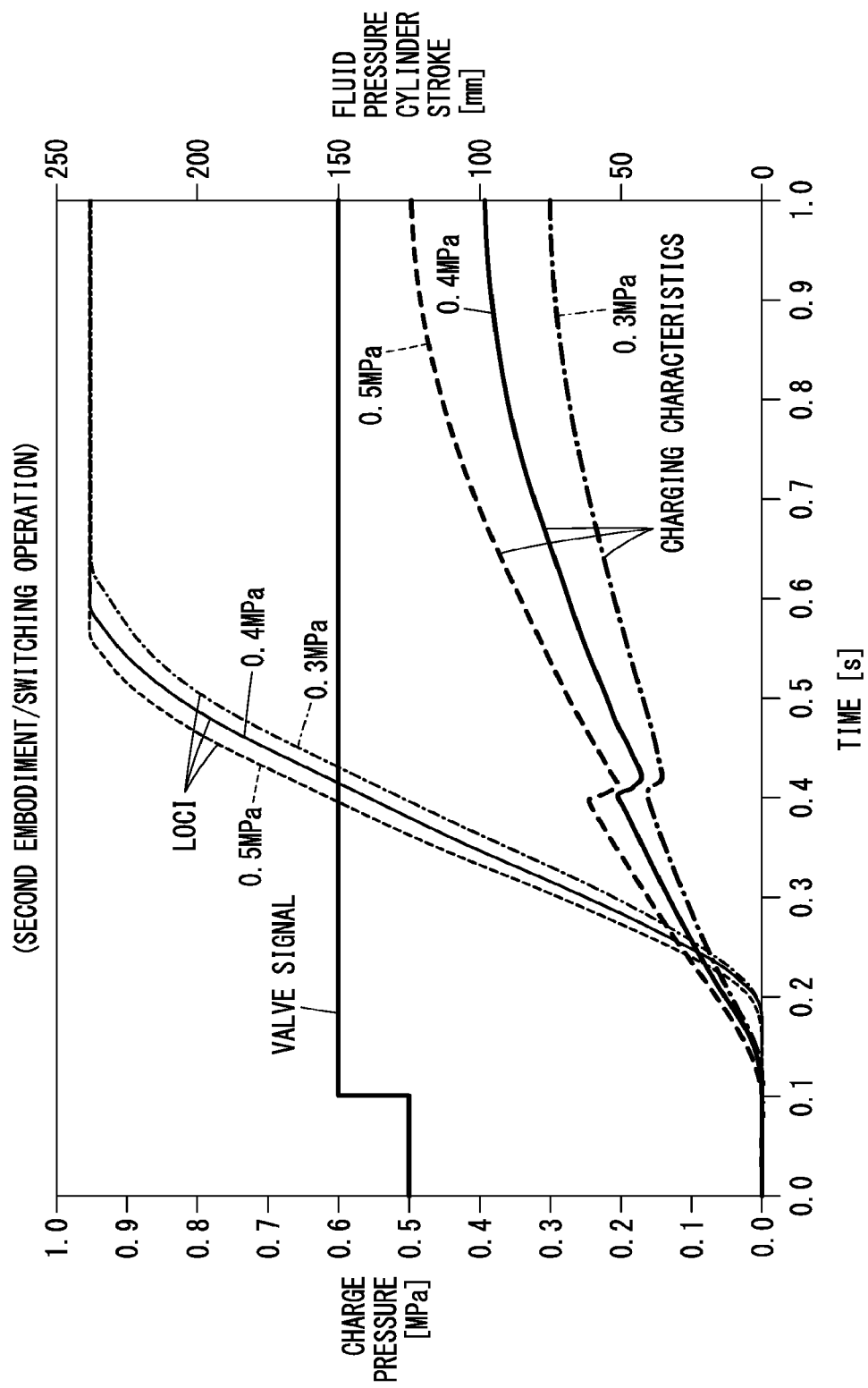
FIG. 17 is a graph illustrating loci of the fluid pressure cylinder connected to the flow rate controller according to the second embodiment and charging characteristics of the first module according to the second embodiment.

As shown in FIG. 17, in the first module 10A of the flow rate controller 150 of the present embodiment, a step appears near 0.4 seconds in each of the charging characteristics of the first module 10A. This step is caused by the movement of the spool 60 of the switching valve 18, and indicates the timing at which the switching valve 18 of the first module 10A switches. As shown in the drawing, the time at which the steps of the charging characteristics occur hardly change from 0.3 MPa to 0.5 MPa, and it is understood that the variation of the delay time is suppressed.

Focusing on the loci of the fluid pressure cylinder 120 in FIG. 17, it can be seen that the variation in the loci of the fluid pressure cylinder 120 is suppressed, and the variation width in the end time of the stroke of the piston 120a is smaller than that in Comparative Example 2. As described above, by using the flow rate controller 150 of the present embodiment, it is possible to suppress the variation in the loci of the fluid pressure cylinder 120 due to the pressure fluctuation of the fluid supply source 112. Therefore, it is possible to reduce wasteful waiting time of the switching of the valve signal and to shorten the cycle time of the fluid pressure cylinder 120.

Next, the operation of the flow rate controller 150 when the valve signal of the operation switching valve 100 is switched from "ON" to "OFF" will be described.

Figure 18:
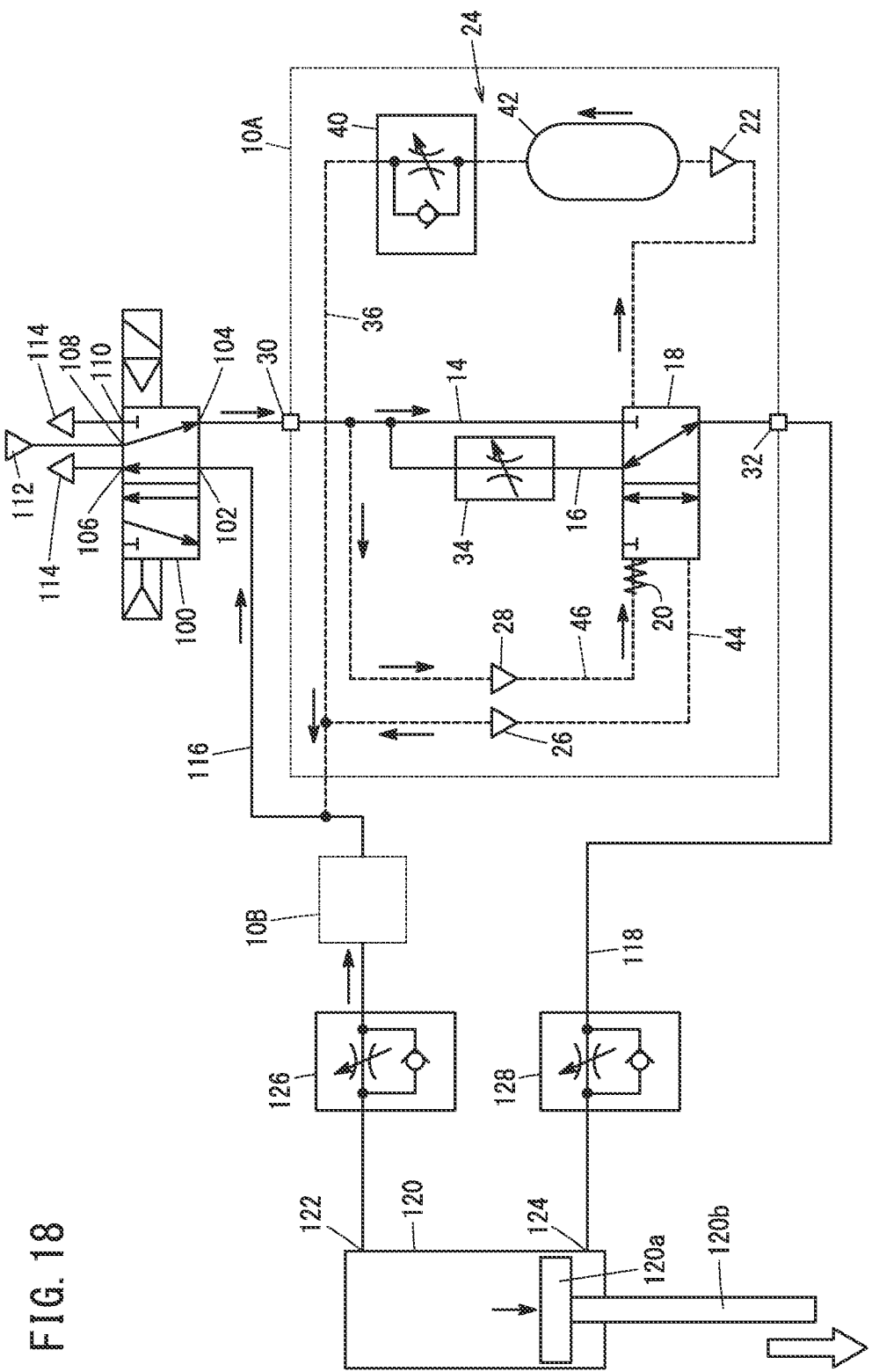
FIG. 18 is a fluid circuit diagram illustrating the operation of the first module of the flow rate controller of FIG. 10 (part 3)

As shown in FIG. 18, when the valve signal of the operation switching valve 100 is switched from ON to OFF, the first supply and discharge path 116 is connected to the fluid discharge unit 114, and the second supply and discharge path 118 is connected to the fluid supply source 112. Note that the operation of the first supply and discharge path 116 and the second module 10B is the same as the operation of the first module 10A described with reference to FIGS. 14 and 15, and the description thereof will be omitted. Immediately after the valve signal of the operation switching valve 100 is switched from "ON" to "OFF", the volume portion 42 of the first module 10A is charged with the pilot fluid, and the switching valve 18 is held at the second position by the action of the biasing force of the drive mechanism 22.

Figure 19:
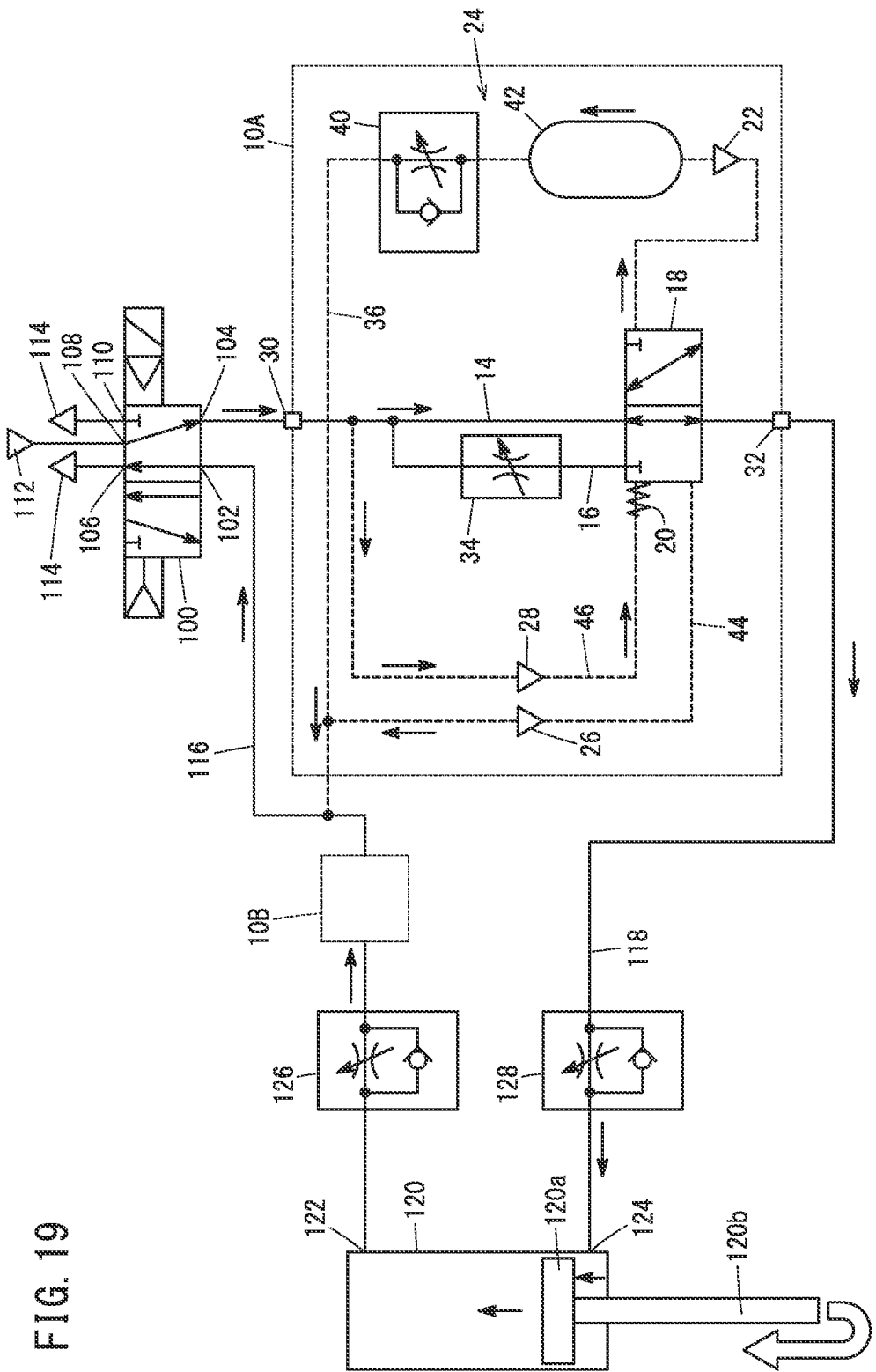
FIG. 19 is a fluid circuit diagram illustrating the operation of the first module of the flow rate controller of FIG. 10 (part 4)

Thereafter, when a predetermined time elapses, the pilot fluid charged in the compensation mechanism 26 and the volume portion 42 is discharged to the first supply and discharge path 116. In addition, a part of the control target fluid in the second supply and discharge path 118 flows into the return mechanism 28 through the return flow path 46. At timing when the pressure of the pilot fluid in the volume portion 42 decreases and the biasing force of the drive mechanism 22 falls below the biasing forces of the biasing member 20 and the return mechanism 28, the switching valve 18 returns to the first position as shown in FIG. 19. Then, the control target fluid is supplied to the fluid pressure cylinder 120 through the first module 10A, and the stroke of the fluid pressure cylinder 120 is started.

As described above, since the stroke of the fluid pressure cylinder 120 is started at the timing at which the switching valve 18 returns to the first position, if the return timing of the switching valve 18 varies, the stroke of the fluid pressure cylinder 120 varies. The amount of pilot fluid charged in the volume portion 42 increases or decreases in accordance with the supply pressure of the fluid supply source 112. On the other hand, in the present embodiment, since the biasing force corresponding to the supply pressure of the fluid supply source 112 is added to the biasing force of the biasing member 20 through the return mechanism 28, it is possible to cancel the influence of the increase or decrease in the amount of the pilot fluid charged in the volume portion 42 by the return mechanism 28.

Hereinafter, with reference to FIGS. 20 and 21, a description will be given of results obtained by examining the charging characteristics of the first module 10A and the loci of the stroke of the fluid pressure cylinder 120 when the operation switching valve 100 is switched from "ON" to "OFF" with respect to each of the flow rate controller of Comparative Example 3 and the flow rate controller 150 of the present embodiment. Here, the results are shown when the supply pressures of the compressed air of the fluid supply source 112 are 0.3 MPa, 0.4 MPa, and 0.5 MPa. The flow rate controller of Comparative Example 3 is constituted by a time delay valve that does not include the return mechanism 28.

Figure 20:
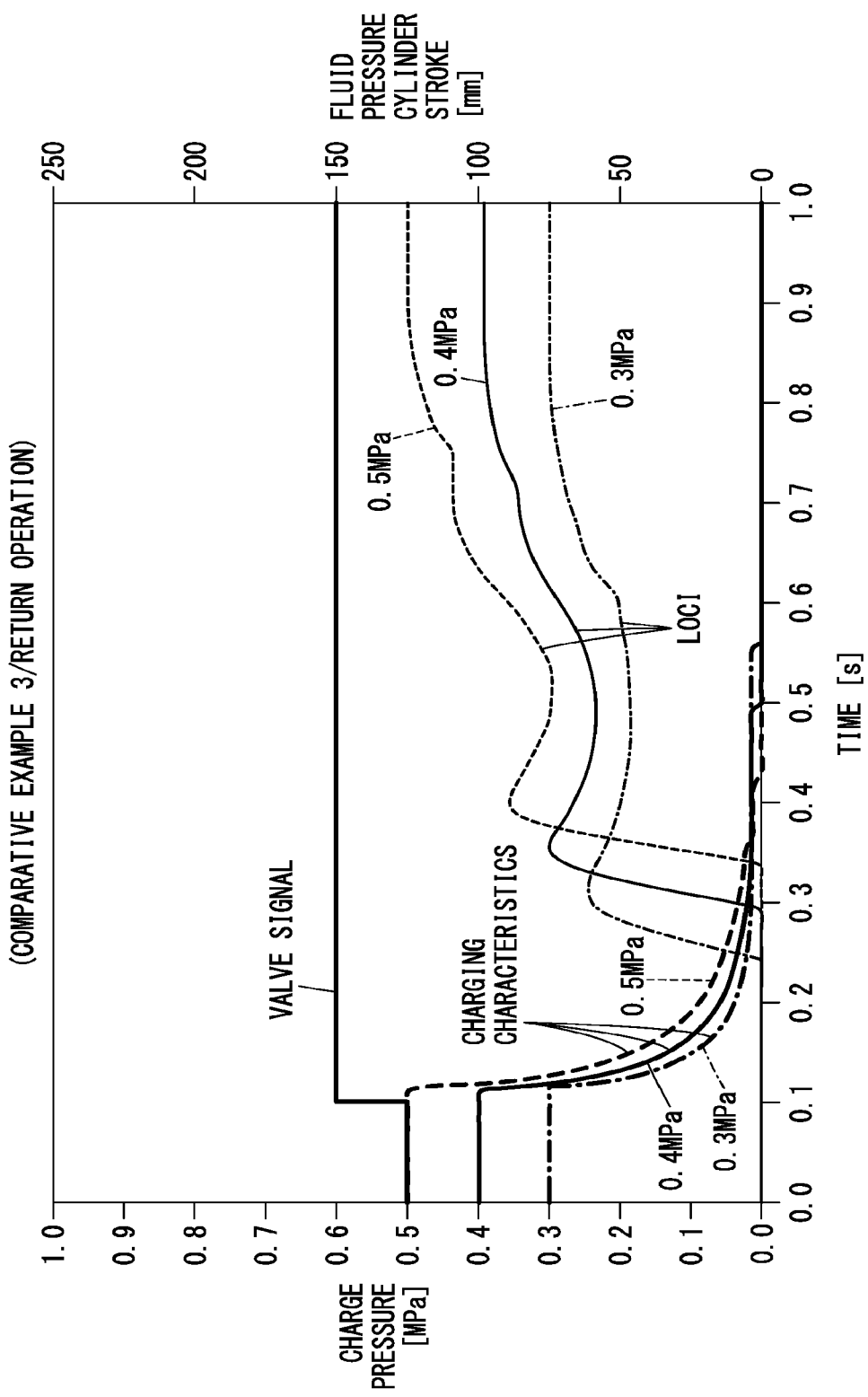
FIG. 20 is a graph illustrating return response characteristics of a first module according to Comparative Example 3.

As shown in FIG. 20, in the flow rate controller of Comparative Example 3, the pilot pressure of the volume portion 42 tends to decrease earlier in the order of 0.3 MPa, 0.4 MPa, and 0.5 MPa for the pressure of the fluid supply source 112. In addition, the loci of the fluid pressure cylinder 120 rise after a delay time ranging from 0.15 seconds to 0.25 seconds after the valve signal is switched. Thus, there is variation in the time until the piston 120a of the fluid pressure cylinder 120 starts to operate. As described above, in the flow rate controller of Comparative Example 3 configured by the time delay valve without the return mechanism 28, it is found that the start timing of the stroke of the fluid pressure cylinder 120 is greatly affected by the fluid supply source 112.

Figure 21:
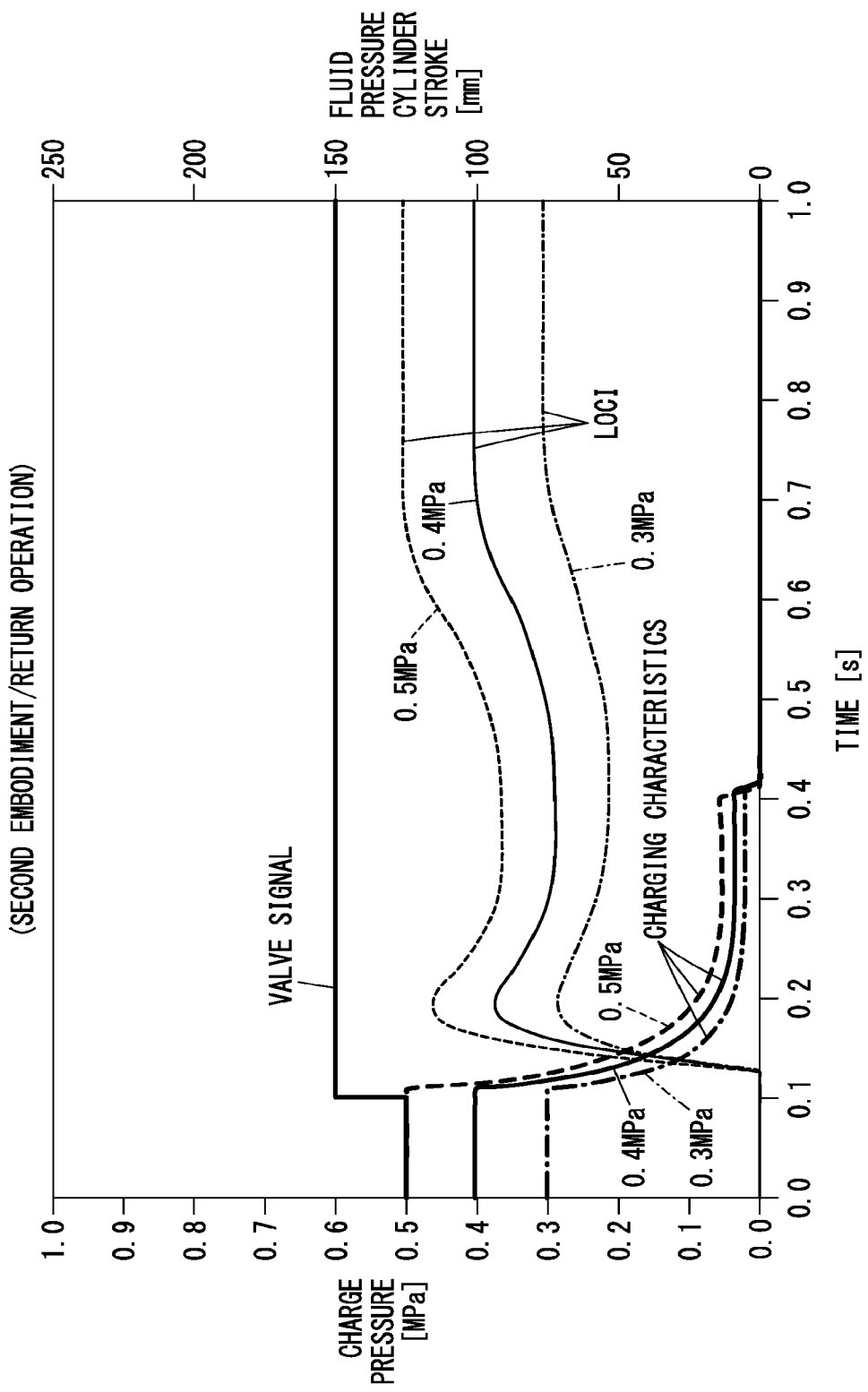
FIG. 21 is a graph illustrating return response characteristics of the first module of FIG. 10.

On the other hand, as shown in FIG. 21, in the flow rate controller 150 of the present embodiment, although the charging characteristics show the same tendency as those of the flow rate controller of Comparative Example 3, the loci of the fluid pressure cylinder 120 rise about 0.025 seconds after the valve signal is switched, and it can be seen that the delay time until the start of the stroke of the fluid pressure cylinder 120 is shorter than that of Comparative Example 3. In addition, even if the supply pressure of the fluid supply source 112 changes in the range of 0.3 to 0.5 MPa, the rising time of each of the loci does not change, and it can be seen that the start timing of the stroke of the fluid pressure cylinder 120 is not affected by the pressure fluctuation of the fluid supply source 112.

From the above results, it can be confirmed that, according to the flow rate controller 150 of the present embodiment, the delay time until the start of the stroke of the fluid pressure cylinder 120 can be shortened, and that the variation in the stroke start timing of the fluid pressure cylinder 120 can be suppressed even when the supply pressure of the fluid supply source 112 fluctuates. Therefore, according to the flow rate controller 150 of the present embodiment, it is possible to shorten the waiting time set in the valve signal and to shorten the cycle time.

The flow rate controller 150 of the present embodiment realizes the following advantageous effects.

The flow rate controller 150 includes the first supply and discharge path 116 configured to supply and discharge fluid to and from the head-side port (one port) 122 of the fluid pressure cylinder 120, the second supply and discharge path 118 configured to supply and discharge fluid to and from rod-side port (another port) 124 of the fluid pressure cylinder 120, the operation switching valve 100 configured to switch and connect the fluid supply source 112 and the fluid discharge unit 114 to the first supply and discharge path 116 and the second supply and discharge path 118, the fluid supply source 112 being configured to supply the control target fluid and the fluid discharge unit 114 being configured to discharge fluid, and the time delay valves (first module 10A and second module 10B) provided in the first supply and discharge path 116 and the second supply and discharge path 118, respectively, wherein each of the time delay valves (first module 10A and second module 10B) includes the switching valve 18 configured to be switched between the first position and the second position, the biasing member 20 configured to bias the switching valve 18 toward the first position, the drive mechanism 22 configured to bias the switching valve 18 toward the second position under the action of the supply pressure of the pilot fluid, the pilot flow path 36 configured to guide the pilot fluid to the drive mechanism 22, and the delay mechanism 24 configured to delay the switching timing of the switching valve 18, and wherein the delay mechanism 24 includes the first throttle valve 34 provided in the pilot flow path 36, and the compensation mechanism 26 configured to bias the switching valve 18 toward the first position under the action of the supply pressure of the pilot fluid.

According to the above-described configuration, even if the supply pressure of the pilot fluid fluctuates, it is possible to suppress the variation in the delay time of each of the first module 10A and the second module 10B and to suppress variation in the loci of the fluid pressure cylinder 120. As a result, the waiting time at the time of switching the operation of the fluid pressure cylinder 120 can be reduced, and the cycle time of the fluid pressure cylinder 120 can be shortened to improve the operation speed.

In the flow rate controller 150 described above, the pilot flow path 36 of the second module 10B (time delay valve) of the first supply and discharge path 116 may be connected to the second supply and discharge path 118, and the pilot flow path 36 of the first module 10A (time delay valve) of the second supply and discharge path 118 may be connected to the first supply and discharge path 116. Thus, the device configuration of the flow rate controller 150 can be simplified.

Although descriptions of preferred embodiments of the present invention have been presented above, it should be understood that the present invention is not limited to the above-described embodiments, but various changes and modifications may be made within a range that does not deviate from the essence and gist of the present invention.

The invention claimed is:

1. A time delay valve comprising:
a switching valve configured to be switched between a first position and a second position;
a first flow path configured to allow communication at the first position of the switching valve;
a second flow path configured to allow communication at the second position of the switching valve; and
a first throttle valve provided in at least one of the first flow path or the second flow path;
a biasing member configured to bias the switching valve toward the first position;
a drive mechanism configured to bias the switching valve toward the second position under an action of a supply pressure of a pilot fluid;
a pilot flow path configured to guide the pilot fluid to the drive mechanism; and
a delay mechanism configured to delay switching timing of the switching valve,
wherein the delay mechanism includes:

a delay throttle valve provided in the pilot flow path; and
a compensation mechanism configured to bias the switching valve toward the first position prior to biasing by the drive mechanism under an action of the supply pressure of the pilot fluid, and
wherein the compensation mechanism is driven by a part of the pilot fluid flowing thereinto through a compensation flow path branched from the pilot flow path, and compensates a biasing force when the drive mechanism displaces the switching valve, in accordance with fluctuation in the supply pressure of the pilot fluid.

2. The time delay valve according to claim 1, further comprising an operation switching valve connected to the first flow path and the pilot flow path, and configured to connect the first flow path and the pilot flow path to a fluid supply source or a fluid discharge unit,
wherein the pilot flow path is connected to a port of the operation switching valve that is different from a port of the operation switching valve to which the first flow path is connected.

3. The time delay valve according to claim 1, wherein the compensation mechanism includes a piston mechanism configured to generate a biasing force opposite to that of the drive mechanism under the action of the supply pressure of the pilot fluid.

4. The time delay valve according to claim 3, wherein the compensation mechanism is supplied with the pilot fluid through the compensation flow path branched from the pilot flow path on an upstream side of the delay throttle valve.

5. The time delay valve according to claim 1, further comprising:
a return mechanism configured to generate a biasing force opposite to that of the drive mechanism; and
a return ow path branched from the first flow path or the second flow path and connected to the return mechanism.

6. The time delay valve according to claim 5, wherein the switching valve includes a spool and a sleeve in which the spool slides,
the drive mechanism includes a drive piston chamber provided at one end of the spool and a drive piston configured to partition the drive piston chamber into a first empty chamber and a second empty chamber, and
the drive piston includes a first pressure receiving surface on a side of the first empty chamber, the first pressure receiving surface being configured to receive the supply pressure of the pilot fluid to generate the biasing force toward the second position.

7. The time delay valve according to claim 6, wherein the drive piston is formed integrally the spool, and the compensation mechanism includes in the drive piston a second pressure receiving surface that faces the second empty chamber and is provided on an opposite side from the first pressure receiving surface.

8. The time delay valve according to claim 7, wherein an area of the second pressure receiving surface is smaller than an area of the first pressure receiving surface.

9. The time delay valve according to claim 8, wherein the return mechanism comprises a return piston formed at another end of the spool and a return piston chamber configured to house the return piston.

10. The time delay valve according to claim 9, wherein the biasing member is disposed in the return piston chamber.

11. A flow rate controller comprising:
a first supply and discharge path configured to supply and discharge fluid to and from one port of a fluid pressure cylinder;

a second supply and discharge path configured to supply and discharge fluid to and from another port of the fluid pressure cylinder;

an operation switching valve configured to switch and connect a fluid supply source and a fluid discharge unit to the first supply and discharge path and the second supply and discharge path, the fluid supply source being configured to supply a control target fluid and the fluid discharge unit being configured to discharge fluid; and time delay valves provided in the first supply and discharge path and the second supply and discharge path, respectively, wherein each of the time delay valves comprises:

a switching valve configured to be switched between a first position and a second position;

a biasing member configured to bias the switching valve toward the first position;

a drive mechanism configured to bias the switching valve toward the second position under an action of a supply pressure of a pilot fluid;

a pilot flow path configured to guide the pilot fluid to the drive mechanism; and a delay mechanism configured to delay switching timing of the switching valve, wherein the delay mechanism comprises:

a first throttle valve provided in the pilot flow path; and a compensation mechanism configured to bias the switching valve toward the first position prior to biasing by the drive mechanism under an action of the supply pressure of the pilot fluid, wherein the compensation mechanism is driven by a part of the pilot fluid flowing thereinto through a compensation flow path branched from the pilot flow path, and compensates a biasing force when the drive mechanism displaces the switching valve, in accordance with fluctuation in the supply pressure of the pilot fluid, and wherein the pilot flow path of the time delay valve of the first supply and discharge path is connected to the second supply and discharge path, and the pilot flow path of the time delay valve of the second supply and discharge path is connected to the first supply and discharge path.

* * * * *